(12) United States Patent
Yang et al.

(10) Patent No.: US 8,958,380 B2
(45) Date of Patent: Feb. 17, 2015

(54) METHOD AND DEVICE FOR TRANSMITTING CONTROL INFORMATION

(75) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 13/634,471

(22) PCT Filed: Mar. 21, 2011

(86) PCT No.: PCT/KR2011/001921
§ 371 (c)(1),
(2), (4) Date: Sep. 12, 2012

(87) PCT Pub. No.: WO2011/118943
PCT Pub. Date: Sep. 29, 2011

(65) Prior Publication Data
US 2013/0016687 A1    Jan. 17, 2013

Related U.S. Application Data

(60) Provisional application No. 61/315,996, filed on Mar. 22, 2010.

(51) Int. Cl.
*H04W 4/00*    (2009.01)
*H04L 1/16*    (2006.01)
(Continued)

(52) U.S. Cl.
CPC ............ *H04L 1/1614* (2013.01); *H04L 1/1861* (2013.01); *H04L 5/0053* (2013.01); *H04L 5/0055* (2013.01); *H04L 5/0087* (2013.01); *H04L 5/0007* (2013.01)
USPC ............ 370/329; 370/280; 455/450; 455/509

(58) Field of Classification Search
USPC .................................. 370/329; 455/450, 509
See application file for complete search history.

(56) References Cited

U.S. PATENT DOCUMENTS

2009/0022135 A1    1/2009    Papasakellariou et al.
2009/0041139 A1    2/2009    Cho et al.
(Continued)

FOREIGN PATENT DOCUMENTS

CN    101478379 A    7/2009
WO    WO 2010/016698 A2    2/2010

OTHER PUBLICATIONS

3GPP TSG RAN WGI #60, "CQI feedback for LTE-A", CATT, R1-100878, pp. 22-26, Feb. 2010.
(Continued)

*Primary Examiner* — Hassan Kizou
*Assistant Examiner* — Deepa Belur
(74) *Attorney, Agent, or Firm* — Birch, Stewart, Kolasch & Birch, LLP

(57) ABSTRACT

The present invention relates to a wireless communication system. In particular, the present invention relates to a method and a device for transmitting ACK/NACK through PUSCH, and comprises the following steps: receiving one or more data; generating ACK/NACK information on the one or more data; and writing the ACK/NACK information on a matrix that corresponds to a PUSCH resource, wherein the ACK/NACK information is written on the matrix moving from the top side to the bottom side in accordance with a time-first method, in a first transmission mode, and wherein the ACK/NACK information is written on a subset of a column in the matrix moving from the bottom side to the top side of the matrix, in a second transmission mode.

12 Claims, 20 Drawing Sheets

(51) Int. Cl.
*H04L 1/18* (2006.01)
*H04L 5/00* (2006.01)

(56) References Cited

U.S. PATENT DOCUMENTS

2009/0296644 A1* 12/2009 Cheon et al. ............... 370/329
2010/0165931 A1* 7/2010 Nimbalker et al. ........... 370/329
2012/0127948 A1* 5/2012 Chung et al. ............... 370/329
2012/0134332 A1* 5/2012 Lin et al. ................... 370/329
2012/0314671 A1* 12/2012 Noh et al. .................. 370/329
2013/0201952 A1* 8/2013 Grant et al. ................ 370/329

OTHER PUBLICATIONS

3GPP TSG RAN WGI #49bis, "Uplink Transmission of CQI and Ack/Nack", Motorola, R1-072706, pp. 25-59 Jun. 2007.

* cited by examiner

METHOD AND DEVICE FOR
TRANSMITTING CONTROL INFORMATION

CROSS REFERENCE TO RELATED APPLICATIONS

This application is the National Phase of PCT/KR2011/001921 filed on Mar. 21, 2011, which claims priority under 35 U.S.C. §119(e) to U.S. Provisional Application No. 61/315,996 filed on Mar. 22, 2010, all of which are hereby expressly incorporated by reference into the present application.

TECHNICAL FIELD

The present invention relates to a wireless communication system, and more particularly, to a method for transmitting control information and a device for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for efficiently transmitting control information in a wireless communication system and a device for the same. Another object of the present invention is to provide a method for efficiently performing piggyback of control information to data and a device for the same. Other object of the present invention is to provide a method for efficiently performing piggyback of control information to an uplink shared channel in a state of carrier aggregation.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for transmitting acknowledgement/negative acknowledgement (ACK/NACK) from a user equipment through a physical uplink shared channel (PUSCH) in a wireless communication system comprises the steps of receiving one or more data; generating ACK/NACK information on the one or more data; and writing the ACK/NACK information on a matrix corresponding to a PUSCH resource, wherein the ACK/NACK information is written on the matrix moving from the top side to the bottom side in accordance with a time-first method, in a first transmission mode, and the ACK/NACK information is written on a subset of a column in the matrix moving from the bottom side to the top side of the matrix, in a second transmission mode.

In another aspect of the present invention, a user equipment configured to transmit acknowledgement/negative acknowledgement (ACK/NACK) through a physical uplink shared channel (PUSCH) in a wireless communication system comprises a radio frequency (RF) unit; and a processor, wherein the processor is configured to receive one or more data, generate ACK/NACK information on the one or more data, and write the ACK/NACK information on a matrix corresponding to a PUSCH resource, the ACK/NACK information is written on the matrix moving from the top side to the bottom side in accordance with a time-first method, and the ACK/NACK information is written on a subset of a column in the matrix moving from the bottom side to the top side of the matrix, in a second transmission mode.

Preferably, the ACK/NACK information is written in elements of a second row after elements of a first row are all written in the first transmission mode.

Preferably, the column subset corresponds to a single carrier frequency division multiple access (SC-FDMA) symbol next to a SC-FDMA symbol for a reference signal.

Preferably, if channel quality information is scheduled to be transmitted for the same subframe as that of the ACK/NACK information in the first transmission mode, the channel quality information and the ACK/NACK information are written within the matrix in accordance with the time-first rule in a concatenation state.

Preferably, if channel quality information is scheduled to be transmitted for the same subframe as that of the ACK/NACK information in the first transmission mode, the channel quality information and the ACK/NACK information are written within the matrix in accordance with the time-first rule in an interleaved state.

Preferably, if channel quality information is scheduled to be transmitted for the same subframe as that of the ACK/NACK information in the first transmission mode, transmission of the channel quality information is dropped.

Preferably, the first transmission mode or the second transmission mode are selected considering at least one of the number of aggregated component carriers (CC), the number of activated carriers, the number of physical downlink shared channels (PDSCH) carrying the data, payload size of full control information of which transmission is required for a corresponding subframe, and payload size of the ACK/NACK information, or related information.

Advantageous Effects

According to the present invention, control information may efficiently be transmitted in the wireless communication system. Also, the control information may be subjected to efficient piggyback to data. Moreover, the control information may be subjected to efficient piggyback to an uplink shared channel in a state of carrier aggregation.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, the following embodiments will be described based on that technical features of the present invention are applied to the 3GPP LTE/LTE-A. However, it is to be understood that the technical spirits of the present invention are not limited to the 3GPP LTE/LTE-A. Also, specific terminologies used hereinafter are provided to assist understanding of the present invention, and various modifications may be made in the specific terminologies within the range that does not depart from the technical spirits of the present invention.

Figure 1:
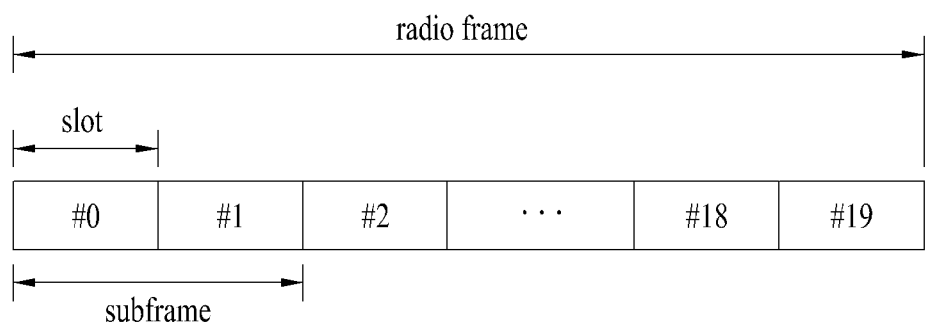
FIG. 1 is a diagram illustrating a structure of a radio frame.

FIG. 1 is a diagram illustrating a structure of a radio frame.

Referring to FIG. 1, the radio frame includes ten (10) subframes, each of which includes two slots in a time domain. The time required to transmit the subframes will be referred to as a transmission time interval (TTI). For example, one subframe may have a length of 1 ms, and one slot may have a length of 0.5 ms. One slot includes a plurality of OFDM symbols or SC-FDMA symbols in a time domain. Since the LTE uses OFDMA in a downlink and uses SC-FDMA in an uplink, OFDM or SC-FDMA symbols represent one symbol interval. A resource block (RB) is a resource allocation unit, and includes a plurality of continuous subcarriers in one slot. The aforementioned structure of the radio frame is only exemplary, and various modifications may be made in the number of subframes included in the radio frame, the number of slots included in the subframe, or the number of symbols included in the slot.

Figure 2:
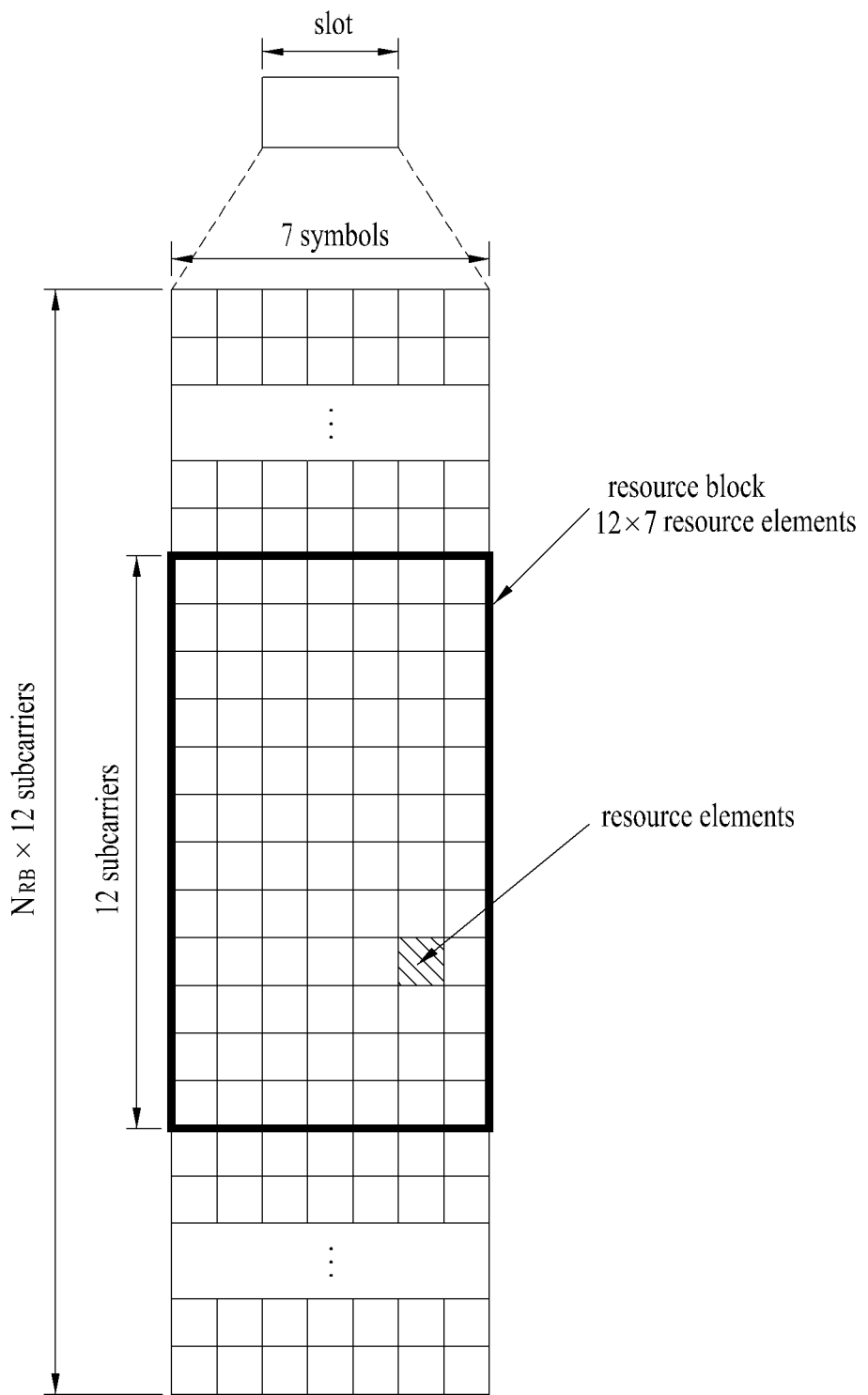
FIG. 2 is a diagram illustrating a resource grid of a downlink slot.

FIG. 2 is a diagram illustrating a resource grid of a downlink slot.

Referring to FIG. 2, the downlink slot includes a plurality of OFDM symbols in a time region. One downlink slot includes seven (six) OFDM symbols, and a resource block includes twelve subcarriers in a frequency domain. Each element on the resource grid will be referred to as a resource element (RE). One resource block (RB) includes 12×7 (6) resource elements. The number $N_{RB}$ of resource blocks (RBs) included in the downlink slot depends on a downlink transmission bandwidth. A structure of an uplink slot is the same as that of the downlink slot except that OFDM symbols are replaced with SC-FDMA symbols.

Figure 3:
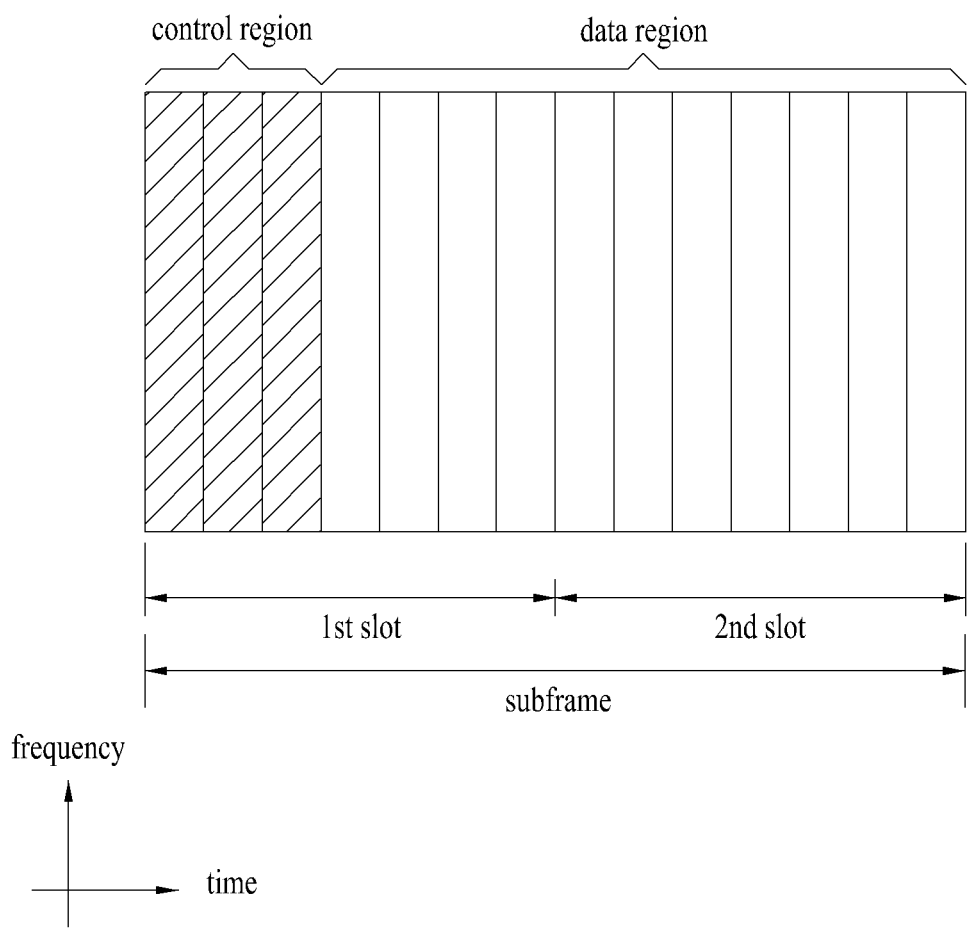
FIG. 3 is a diagram illustrating a structure of a downlink subframe.

FIG. 3 is a diagram illustrating a structure of a downlink subframe.

Referring to FIG. 3, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of the downlink control channel used in the LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) in response to uplink transmission.

The control information transmitted through the PDCCH will be referred to as downlink control information (DCI). The DCI includes resource allocation information for a user equipment or user equipment group and other control information. For example, the DCI includes uplink/downlink scheduling information, uplink transmission (Tx) power control command, etc.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a user equipment group, a transmission power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). The format of the PDCCH and the number of bits of the PDCCH are determined depending on the number of CCEs. A base station determines a PDCCH format depending on the DCI to be transmitted to the user equipment, and attaches cyclic redundancy check (CRC) to the control information. The CRC is masked (or scrambled) with an identifier (for example, radio network temporary identifier (RNTI)) depending on usage of the PDCCH or owner of the PDCCH. For example, if the PDCCH is for a specific user equipment, an identifier (for example, cell-RNTI (C-RNTI)) of the corresponding user equipment may be masked with the CRC. If the PDCCH is for a paging message, a paging identifier (for example, Paging-RNTI (P-RNTI)) may be masked with the CRC. If the PDCCH is for system information (in more detail, system information block (SIB)), system information RNTI (SI-RNTI) may be masked with the CRC. If the PDCCH is for a random access response, a random access RNTI (RA-RNTI) may be masked with the CRC.

Figure 4:
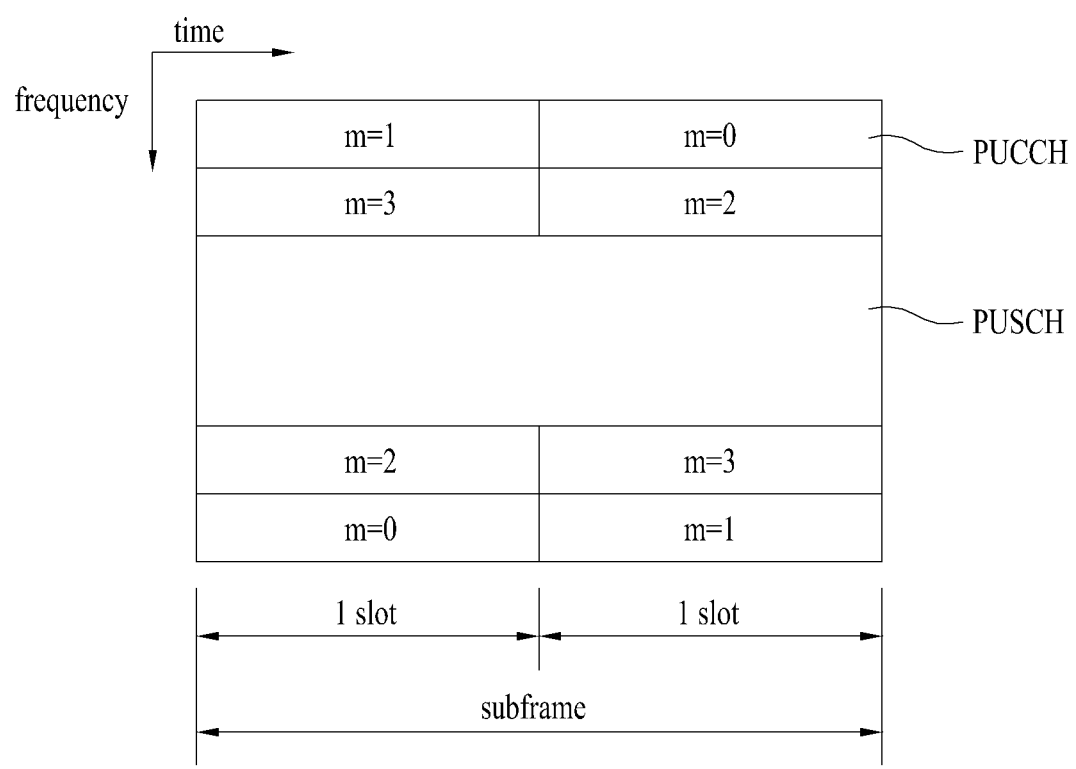
FIG. 4 is a diagram illustrating a structure of an uplink subframe.

FIG. 4 is a diagram illustrating a structure of an uplink subframe in an LTE system.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. For example, in case of normal CP, the slot may include SC-FDMA symbols. The uplink subframe is divided into a data region and a control region in a frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.
- SR (Scheduling Request): is information used to request uplink UL-SCH resource. The SR is transmitted using an on-off keying (OOK) system.
- HARQ ACK/NACK: is a response signal to a downlink data packet on the PDSCH. It represents whether the downlink data packet has been successfully received. ACK/NACK 1 bit is transmitted in response to a single downlink codeword, and ACK/NACK 2 bits are transmitted in response to two downlink codewords.
- CQI (Channel Quality Indicator): is feedback information on a downlink channel. MIMO (Multiple Input Multiple Output) related feedback information includes a rank indicator (RI) and a precoding matrix indicator (PMI). 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH. The PUCCH supports seven formats in accordance with information which is transmitted.

Table 1 illustrates a mapping relation between the PUCCH format and the UCI in the LTE system.

TABLE 1

| PUCCH Format | Uplink Control Information (UCI) |
| --- | --- |
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
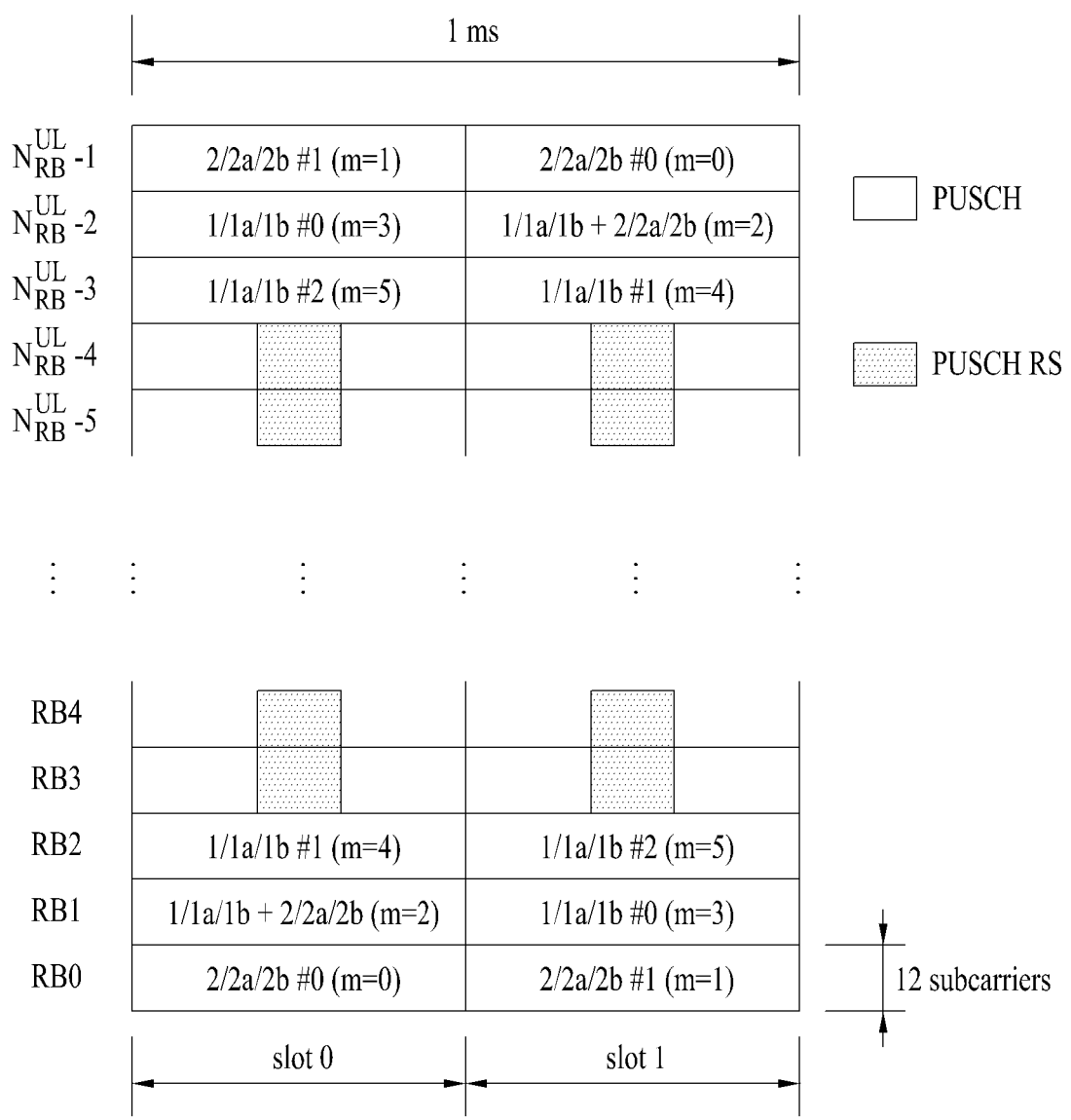
FIG. 5 is a diagram illustrating an example of physical mapping of a PUCCH format into a PUCCH region.

FIG. 5 is a diagram illustrating an example of physical mapping of a PUCCH format into a PUCCH region.

Referring to FIG. 5, the PUCCH format is mapped onto the RBs in order of PUCCH formats 2/2a/2b (CQI) (for example, PUCCH region m=0, 1), PUCCH formats 2/2a/2b (CQI) or PUCCH formats 1/1a/1b (SR/HARQ ACK/NACK) (for example, in case of the presence, PUCCH region m=2), and PUCCH formats 1/1a/1b (SR/HARQ ACK/NACK) (for example, PUCCH region m=3, 4, 5) by starting from band-edge. The number of $N_{RB}^{(2)}$ of PUCCH RBs that may be used for the PUCCH formats 2/2a/2b (CQI) is transmitted to the user equipment through broadcast signaling within the cell.

Periodicity and frequency resolution of CQI reported by the user equipment are controlled by the base station. A periodic CQI report scheme and a non-periodic CQI report scheme are supported in the time domain. The PUCCH format 2 is used for periodic CQI report. However, in the periodic CQI report, if the PUSCH is scheduled for the subframe where CQI transmission is scheduled, the CQI is transmitted through the PUSCH after piggyback to data. The PUSCH is used for the non-periodic CQI report. To this end, the base station commands the user equipment to perform individual CQI report by embedding the individual CQI report in a resource (that is, PUSCH) scheduled for uplink data transmission.

Figure 6:
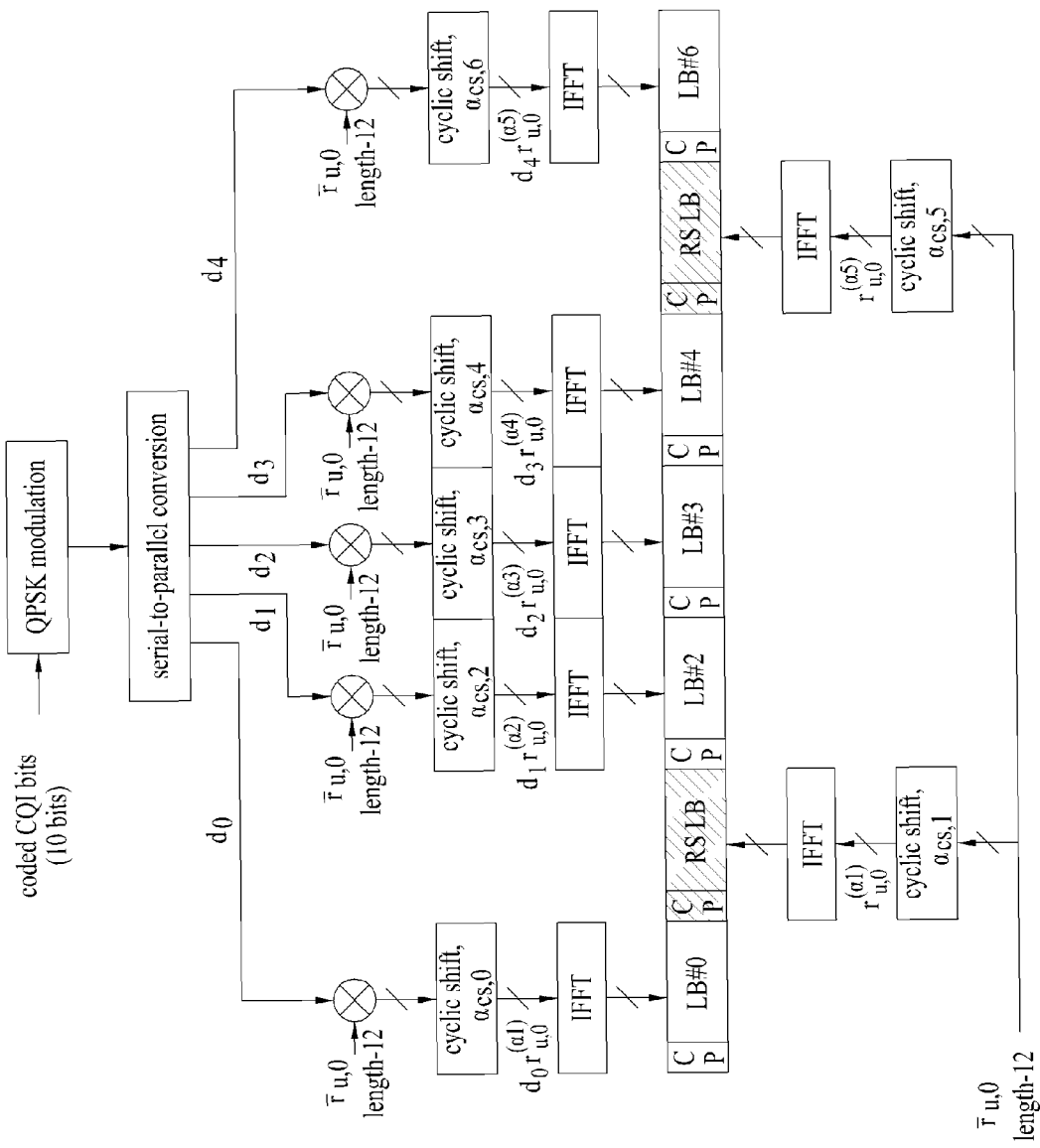
FIG. 6 is a diagram illustrating a structure of a slot level of PUCCH formats 2/2a/2b.

FIG. 6 is a diagram illustrating a structure of a slot level of PUCCH formats 2/2a/2b. The PUCCH formats 2/2a/2b are used for CQI transmission. In case of normal cyclic prefix (CP), SC-FDMA #1 and #5 are used for transmission of demodulation reference signal (DM RS) within the slot. In case of extended CP, SC-FDMA #3 is only used for transmission of the DM RS within the slot.

Referring to FIG. 6, CQI information of 10 bits are channel coded by 20 coded bits using rate ½ punctured (20, k) Reed-Muller codes at a subframe level (not shown). Afterwards, the coded bits are mapped into quadrature phase shift keying (QPSK) constellation (QPSK modulation) through scramble (not shown). Scramble may be performed using length-31 gold sequence similarly to PUSCH data. Ten QPSK modulation symbols are generated and five QPSK modulation symbols $d_0 \sim d_4$ are transmitted from each slot through corresponding SC-FDMA symbols. Each of the QPSK modulation symbols is used to modulate a length-12 base RS sequence ($r_{u,0}$) prior to inverse fast fourier transform (IFFT). Consequently, the RS sequence is cyclic-shifted in the time domain in accordance with the values of the QPSK modulation symbols ($d_x * r_{u,0}$, x=0~4). The RS sequence multiplied by the QPSK modulation symbols is cyclic-shifted ($\alpha_{cs,x}$, x=1, 5). If the number of cyclic shifts is N, N number of user equipments may be multiplexed on the same CQI PUCCH RB. Although the DM RS sequence is similar to CQI sequence in the frequency domain, it is not modulated by CQI modulation symbol.

Parameters/resources for periodic report of the CQI are configured semi-statically by higher layer (for example, RRC) signaling. For example, if a PUCCH resource index $n_{PUCCH}^{(2)}$ is set for CQI transmission, the CQI is transmitted periodically on a CQI PUCCH linked with the PUCCH resource index $n_{PUCCH}^{(2)}$. The PUCCH resource index $n_{PUCCH}^{(2)}$ indicates cyclic shift ($\alpha_{cs}$) and PUCCH RB.

Figure 7:
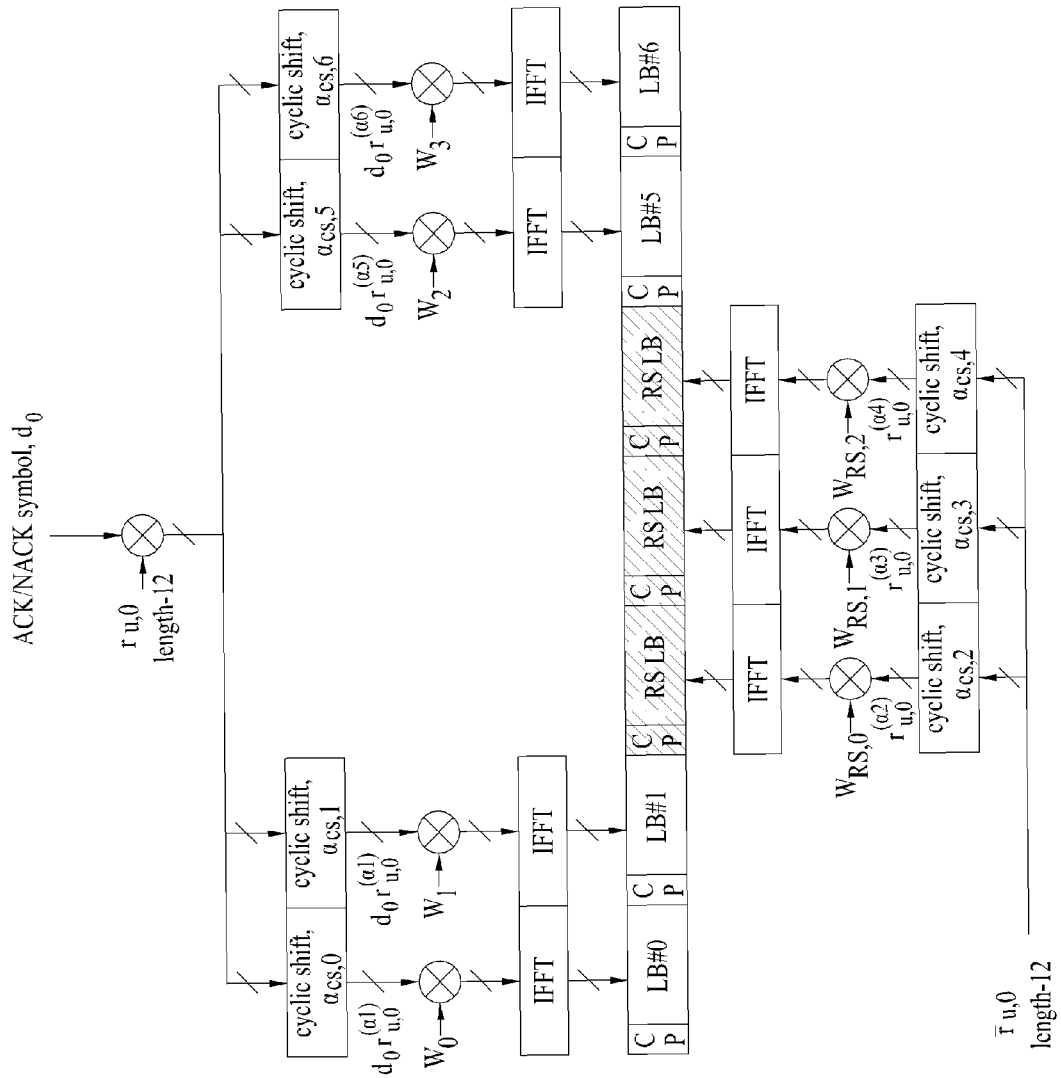
FIG. 7 is a diagram illustrating a structure of a slot level of PUCCH formats 1a/1b.

FIG. 7 is a diagram illustrating a structure of a slot level of PUCCH formats 1a/1b. The PUCCH formats 1a/1b are used for ACK/NACK transmission. In case of normal CP, SC-FDMA #2/#3/#4 are used for transmission of DM RS (Demodulation Reference Signal). In case of extended CP, SC-FDMA #2/#3 are used for transmission of DM RS. Accordingly, four SC-FDMA symbols are used for ACK/NACK transmission in the slot.

Referring to FIG. 7, ACK/NACK information of 1 bit and ACK/NACK information of 2 bits are respectively modulated in accordance with a BPSK modulation scheme and QPSK modulation scheme, and one ACK/NACK modulation symbol ($d_0$) is generated. The ACK/NACK information is set to 1 in case of positive ACK, whereas the ACK/NACK information is set to 0 in case of negative ACK (NACK). The PUCCH formats 1a/1b perform time domain spreading by using orthogonal spreading codes (for example, Walsh-Hadamard or DFT codes) $w_0, w_1, w_2, w_3$ in addition to cyclic shift ($\alpha_{cs,x}$) in the frequency domain in the same manner as the aforementioned CQI. In case of the PUCCH formats 1a/1b, since code multiplexing is used in both the frequency domain and the time domain, more user equipments may be multiplexed on the same PUCCH RB.

The RS transmitted from different user equipments are multiplexed using the same method as that of the UCI. The number of cyclic shifts supported by the SC-FDMA symbols for PUCCH ACK/NACK RB may be configured by a cell-specific higher layer signaling parameter $\Delta_{shift}^{PUCCH}$. $\Delta_{shift}^{PUCCH} \in \{1, 2, 3\}$ respectively represent that shift values are 12, 6 and 4. The number of spreading codes that may actually be used for ACK/NACK in time-domain CDM may be limited by the number of RS symbols. This is because that multiplexing capacity of the RS symbols is smaller than that of UCI symbols due to a small number of RS symbols.

Figure 8:
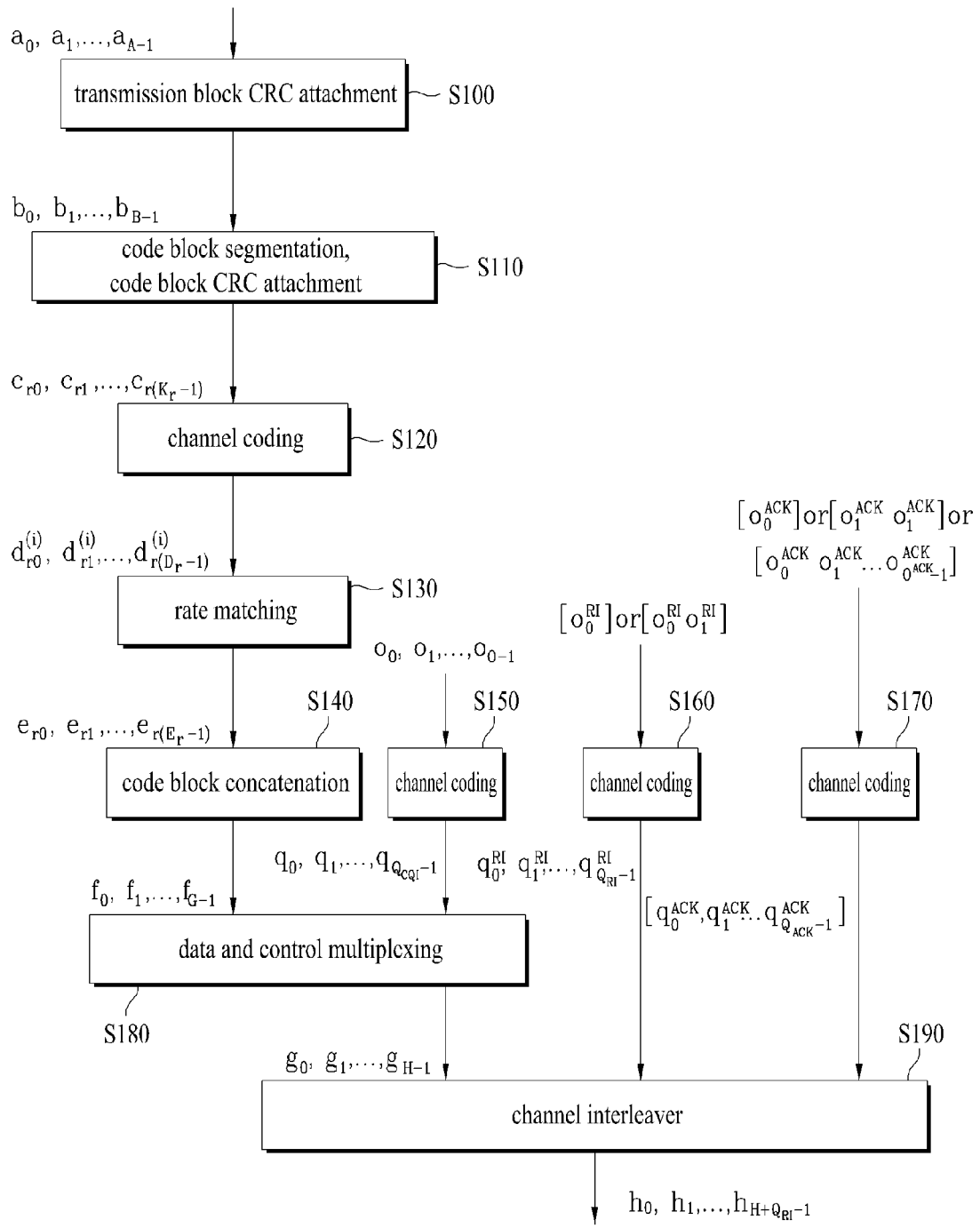
FIG. 8 is a diagram illustrating a procedure of processing UL-SCH data and control information.

FIG. 8 is a diagram illustrating a procedure of processing UL-SCH data and control information.

Referring to FIG. 8, error detection is provided by a UL-SCH transmission block through cyclic redundancy check (CRC) of step S100.

A full transmission block is used to calculate CRC parity bits. Bits of transmission block forwarded to the first layer are $a_0, a_1, a_2, a_3, \ldots, a_{A-1}$이다. The parity bits are $p_0, p_1, p_2, p_3, \ldots, p_{L-1}$. The size of the transmission block is A, and the number of parity bits is L.

Code block segmentation and code block CRC attachment are performed after transmission block CRC attachment of step S110. If B is the number of bits of the transmission block (including CRC), bit inputs for code block segmentation are $b_0, b_1, b_2, b_3, \ldots, b_{B-1}$. If r is the number of code blocks and $K_r$ is the number of bits for the number r of code blocks, bits after code block segmentation are $c_{r0}, c_{r1}, c_{r2}, c_{r3}, \ldots, c_{r(K_r-1)}$.

Channel coding is performed after code block segmentation and code block CRC of step s120. If $D_r$ is the ith coded stream, that is, $D_r = K_r + 4$, for the number r of code blocks, post-coded bits are $d_{r0}^{(i)}, d_{r1}^{(i)}, d_{r2}^{(i)}, d_{r3}^{(i)}, \ldots, d_{r(D_r-1)}^{(i)}$.

Rate matching is performed at turbo-coded block after channel coding of step S130. After rate matching, if r is the number of coded blocks and the number of rate matched bits for the number r of code blocks is $E_r$, the bits are $e_{r0}, e_{r1}, e_{r2}, e_{r3}, \ldots, e_{r(E_r-1)}$.

Code block connection is performed after rate matching of step S140. When control information is multiplexed and transmitted together with UL-SCH transmission, after code block connection, bits are $f_0, f_1, f_2, f_3, \ldots, f_{G-1}$ if G is a total number of coded bits for transmission excluding bits used for control transmission.

Channel coding of channel quality information is performed using input sequences $o_0, o_1, o_2, \ldots, o_{O-1}$ of step S150. Output sequences for channel coding of channel quality information are $q_0, q_1, q_2, q_3, \ldots, q_{Q_{CQI}-1}$.

Channel coding of RI is performed using input sequence $[o_0^{RI}]$ or $[o_0^{RI} o_1^{RI}]$ of step S160. $[o_0^{RI}]$ and $[o_0^{RI} o_1^{RI}]$ respectively mean 1-bit RI and 2-bit RI.

Channel coding of HARQ-ACK is performed by input sequence $[o_0^{ACK}]$, $[o_0^{ACK} o_1^{ACK}]$ or $[o_0^{ACK} o_1^{ACK} \ldots o_{O^{ACK}-1}^{ACK}]$ of step S170. Each ACK is coded to binary '1', and each NACK is coded to binary '0'. HARQ-ACK may be configured by 1 bit (that is, $[o_0^{ACK}]$) of information or 2 bits (that is, $o_0^{ACK}$) of information together with $o_0^{ACK}$ based on ACK/NACK bit for codeword 0 and $o_1^{ACK}$ based on ACK/NACK bit for codeword 1.

1- or 2-bit ACK/NACK or RI is modulated to obtain maximum Euclidean distance of modulation symbols carrying ACK/NACK and RI. In more detail, the outmost constellation point in constellation for 16/64-QAM PUSCH modulation is used for modulation of ACK/NACK or RI, whereby a transmission power of ACK/NACK/RI is more increased than average PUSCH data power. In case of 1-bit ACK/NACK or RI, repetition coding is used. In case of 2-bit ACK/NACK/RI, (3,2) simplex code is used, and encoded data may be repeated cyclically.

Table 2 illustrates an example of channel coding of 1-bit HARQ-ACK, and Table 3 illustrates an example of channel coding of 2-bit HARQ-ACK.

TABLE 2

| $Q_m$ | Encoded HARQ-ACK |
|---|---|
| 2 | $[o_0^{ACK} y]$ |
| 4 | $[o_0^{ACK} y\ x\ x]$ |
| 6 | $[o_0^{ACK} y\ x\ x\ x\ x]$ |

TABLE 3

| $Q_m$ | Encoded HARQ-ACK |
|---|---|
| 2 | $[o_0^{ACK} o_1^{ACK} o_2^{ACK} o_0^{ACK} o_1^{ACK} o_2^{ACK}]$ |
| 4 | $[o_0^{ACK} o_1^{ACK} X X o_2^{ACK} o_0^{ACK} X X o_1^{ACK} o_2^{ACK} X X]$ |
| 6 | $[o_0^{ACK} o_1^{ACK} x\ x\ x\ x\ o_2^{ACK} o_0^{ACK} x\ x\ x\ x\ o_1^{ACK} o_2^{ACK} x\ x\ x\ x]$ |

In this case, Qm represents a modulation order. For example, Qm=2, 4, 6 may correspond to QPSK, 16QAM and 64QAM, respectively. $o_0^{ACK}$ represents ACK/NACK bit for codeword 0, and $o_1^{ACK}$ represents ACK/NACK bit for codeword 1. $o_2^{ACK} = (o_0^{ACK} + o_1^{ACK}) \mod 2$, and mod represents modulo operation. x,y are place holders for obtaining maximum Euclidean distance of modulation symbol carrying HARQ-ACK information during scramble of HARQ-ACK bits. x,y respectively have a value of 0 or 1.

Also, HARQ-ACK may be configured by information of 2 bits or more. In other words, if $O^{ACK} > 2$, $[o_0^{ACK} o_1^{ACK} \ldots$ $o_{Q^{ACK}-1}^{ACK}$] is obtained. If $Q_{ACK}$ is a total number of coded bits for coded HARQ-ACK blocks, bit sequences $q_0^{ACK}$, $q_1^{ACK}$, $q_2^{ACK}$, ..., $q_{Q_{ACK}-1}^{ACK}$ are obtained by combination of a plurality of coded HARQ-ACK blocks.

The inputs for data/control multiplexing blocks are coded bits of UL-SCH, which means $f_0, f_1, f_2, f_3, \ldots, f_{G-1}$ of step S180 and coded bits of control information, which means $q_0, q_1, q_2, q_3, \ldots, q_{Q_{CQI}-1}$.

If $H=(G+Q_{CQI})$, $H'=H/Q_m$, and $\underline{g}_i$ of i=0, ..., H'-1 is a column vector of length $Q_m$, the outputs of the data/control multiplexing blocks are $\underline{g}_0, \underline{g}_1, \underline{g}_2, \underline{g}_3, \ldots, \underline{g}_{H'-1}$. H is a total number of coded bits allocated for UL-SCH data and CQI/PMI information.

Channel interleaving of step S190 is performed based on the outputs $\underline{g}_0, \underline{g}_1, \underline{g}_2, \underline{g}_3, \ldots, \underline{g}_{H'-1}$ of the data/control multiplexing blocks, coded rank indicators $\underline{q}_0^{RI}, \underline{q}_1^{RI}, \underline{q}_2^{RI}, \ldots, \underline{q}_{Q'_{RI}-1}^{RI}$ and coded HARQ-ACK $\underline{q}_0^{ACK}, \underline{q}_1^{ACK}, \underline{q}_2^{ACK}, \ldots, \underline{q}_{Q'_{ACK}-1}^{ACK}$. $\underline{g}_i$ (i=0, ..., H'-1) is a column vector of length $Q_m$, and $H'=H/Q_m$ is obtained. $\underline{q}_i^{ACK}$ (i=0, ..., $Q'_{ACK}-1$) is a column vector of length $Q_m$, and $Q'_{ACK}=Q_{ACK}/Q_m$ is obtained. $\underline{q}_i^{RI}$ (i=0, ..., $Q'_{RI}-1$) is a column vector of length $Q_m$, and $Q'_{RI}=Q_{RI}/Q_m$ is obtained.

Channel interleaving includes multiplexing of control information and UL-SCH data on the PUSCH resource. In more detail, channel interleaving includes mapping of control information and UL-SCH data into a channel interleaver matrix corresponding to the PUSCH resource.

After channel interleaving is performed, bit sequences $h_0, h_1, h_2, \ldots, h_{H+Q_{RI}-1}$ read from the channel interleaver matrix through column-by-column are output. The number of modulation symbols of the subframe is $H''=H'+Q'_{RI}$.

The channel interleaving procedure will be described based on ACK/NACK in more detail. The number of columns of the interleaver matrix is $C_{mux}=N_{symb}^{PUSCH}$. $N_{symb}^{PUSCH}$ is the number of SC-FDMA symbols remaining by subtracting the number of RS SC-FDMA symbols (the number of SRS SC-FDMA symbols in case of SRS subframe) from the number of a total of SC-FDMA symbols included in the subframe. The number of lows of the interleaver matrix is $R_{mux}=(H''\cdot Q_m)/C_{mux}$, and $R'_{mux}=R_{mux}/Q_m$ is defined. After RI is first mapped within the interleaver matrix, CQI/UL-SCH data are mapped into the remaining space. In more detail, the RI is written in a column corresponding to the SC-FDMA symbol shown in FIG. 8, and is written from the bottom to the top of the matrix. The CQI/UL-SCH data are written towards the right side by starting from the left top (that is, column 0 and low 0) of the interleaver matrix. After the rows are all written, the RI shifts to next column and skips an element of the matrix, which has been written.

Table 4 illustrates an interleaver matrix in which RI and CQI/UL-SCH data are written.

TABLE 4

$$\begin{bmatrix} y_0 & y_1 & y_2 & \cdots & y_{-C_{mux}-1} \\ y_{-C_{mux}} & y_{-C_{mux}+1} & y_{-C_{mux}+2} & \cdots & y_{-2C_{mux}-1} \\ \vdots & \vdots & \vdots & \ddots & \vdots \\ y_{-(R'_{mux}-1)\times C_{mux}} & y_{-(R'_{mux}-1)\times C_{mux}+1} & y_{-(R'_{mux}-1)\times C_{mux}+2} & \cdots & y_{-(R'_{mux}\times C_{mux}-1)} \end{bmatrix}$$

HARQ-ACK vector sequences $\underline{q}_0^{ACK}, \underline{q}_1^{ACK}, \underline{q}_2^{ACK}, \ldots, \underline{q}_{Q'_{ACK}-1}^{ACK}$ are overwritten in the values written in the interleaver matrix. HARQ-ACK is written in a column corresponding to the SC-FDMA symbol next to the RS, and is written from the bottom to the top of the matrix.

Table 5 illustrates a procedure of writing HARQ-ACK in the interleaver matrix.

TABLE 5

Set i, j to 0.
Set r to $R'_{mux}-1$
while i < $Q'_{ACK}$
   $c_{ACK}$=ColumnSet(j)
   $\underline{y}_{r\times C_{mux}+c_{ACK}}=\underline{q}_i^{ACK}$
   i=i+1
   r=$R'_{mux}-1-\lfloor i/4 \rfloor$
   j=(j+3)mod4
end while Table 6 illustrates a column set in which HARQ-ACK is written.

TABLE 6

| CP configuration | Column Set |
| --- | --- |
| Normal | {2, 3, 8, 9} |
| Extended | {1, 2, 6, 7} |

Figure 9:
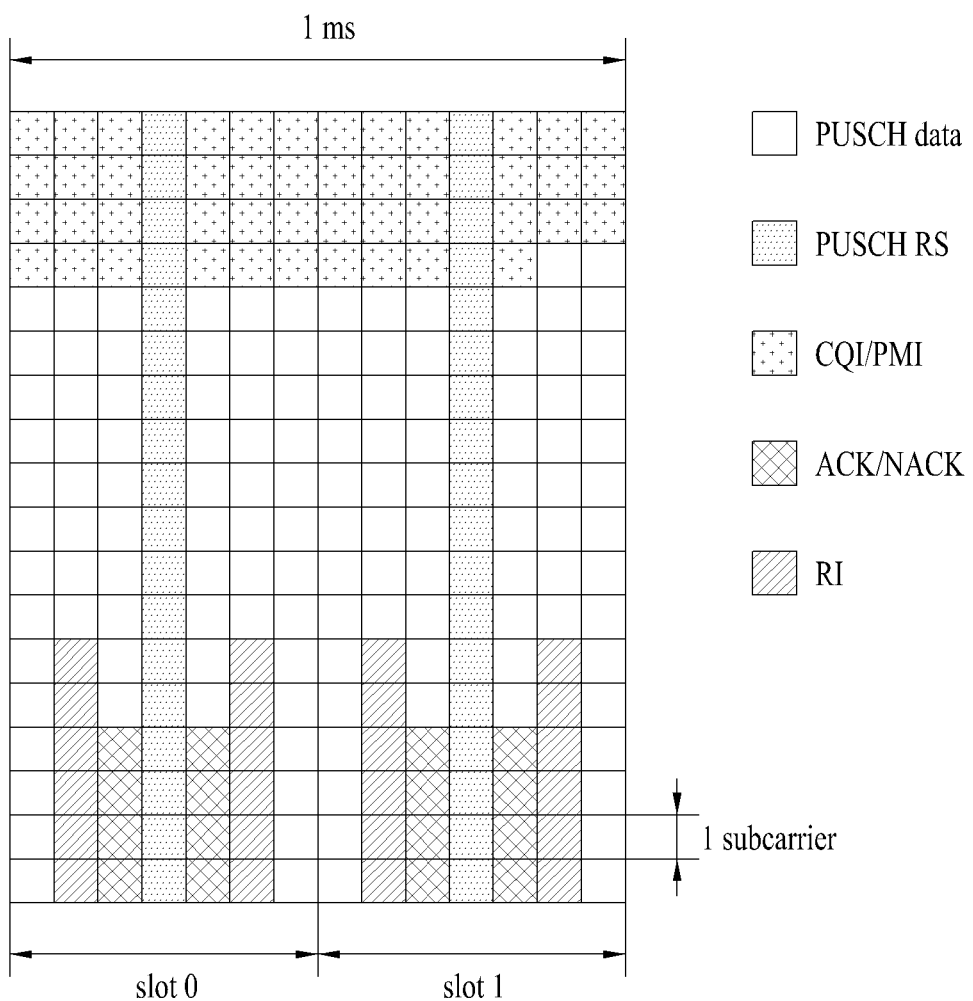
FIG. 9 is a diagram illustrating multiplexing of control information and UL-SCH data on a PUSCH.

FIG. 9 is a diagram illustrating multiplexing of control information and UL-SCH data on a PUSCH. If transmission of control information is intended for the subframe where PUSCH transmission is allocated, the user equipment multiplexes the control information (UCI) and the UL-SCH data prior to DFT-spreading. The control information includes at least one of CQI/PMI, HARQ ACK/NACK and RI. The number of REs used for transmission of CQI/PMI, ACK/NACK and RI is based on modulation and coding scheme (MCS) and offset values ($\Delta_{offset}^{CQI}$, $\Delta_{offset}^{HARQ-ACK}$, $\Delta_{offset}^{RI}$) allocated for PUSCH transmission. The offset values allow different coding rates in accordance with the control information and are set semi-statically by higher layer (for example, RRC0 signaling. The UL-SCH data and the control information are not mapped into the same RE. The control information is mapped to exist in two slots of the subframe. Since the base station may previously know that the control information will be transmitted through the PUSCH, it may easily demultiplex the control information and data packet.

Referring to FIG. 9, CQI and/or PMI (CQI/PMI) resources are located at a start part of UL-SCH data resources, and are sequentially mapped into all the SC-FDMA symbols on one subcarrier and then mapped on next subcarrier (time first mapping). CQI/PMI are mapped from the left to the right within the subcarrier, that is, to increase the SC-FDMA symbol index. The PUSCH data (UL-SCH data) are rate-matched considering the CQI/PMI. The same modulation order as that of the UL-SCH data is used for the CQI/PMI. If CQI/PMI information size (payload size) is small (for example, less than 11 bits), (32, k) block code is used for CQI/PMI information similarly to PUCCH transmission, and encoded data may be repeated cyclically. If the CQI/PMI information size is small, CRC is not used. If the CQI/PMI information size is great (for example, more than 11 bits), 8-bit CRC is added, and channel coding and rate matching are performed using a tail-biting convolutional code. The ACK/NACK is inserted into a part of SC-FDMA resources into which the UL-SCH data are mapped, through puncturing. The ACK/NACK is located next to the RS, and is filled from the bottom to the top within the corresponding SC-FDMA symbol, that is, to increase subcarrier index. In case of normal CP, SC-FDMA symbols for ACK/NACK are located at SC-FDMA symbols #2/#5 in each slot as shown. The coded RI symbol is located next to the symbols for ACK/NACK regardless of the fact that the ACK/NACK is actually transmitted for the subframe. The RI and the CQI/PMI are coded independently, and the UL-SCH data are rate matched considering RI similarly to the CQI/PMI.

In the LTE, the control information (for example, use of QPSK modulation) may be scheduled to be transmitted on the PUSCH without the UL-SCH data. The control information (CQI/PMI, RI and/or ACK/NACK) is multiplexed prior DFT-spreading to maintain low cubic metric (CM) single-carrier feature. Multiplexing of ACK/NACK, RI and CQI/PMI is similar to that shown in FIG. 9. The SC-FDMA symbol for ACK/NACK is located next to the RS, and a resource into which CQI is mapped may be punctured. The number of REs for ACK/NACK and RI is based on reference MCS (CQI/PMI MCS) and offset parameter ($\Delta_{offset}^{CQI}$, $\Delta_{offset}^{HARQ-ACK}$, or $\Delta_{offset}^{RI}$). The reference MCS is calculated from CQI payload size and resource allocation. Channel coding and rate matching for control signaling having no UL-SCH data are the same as the aforementioned control signaling having UL-SCH data.

Figure 10:
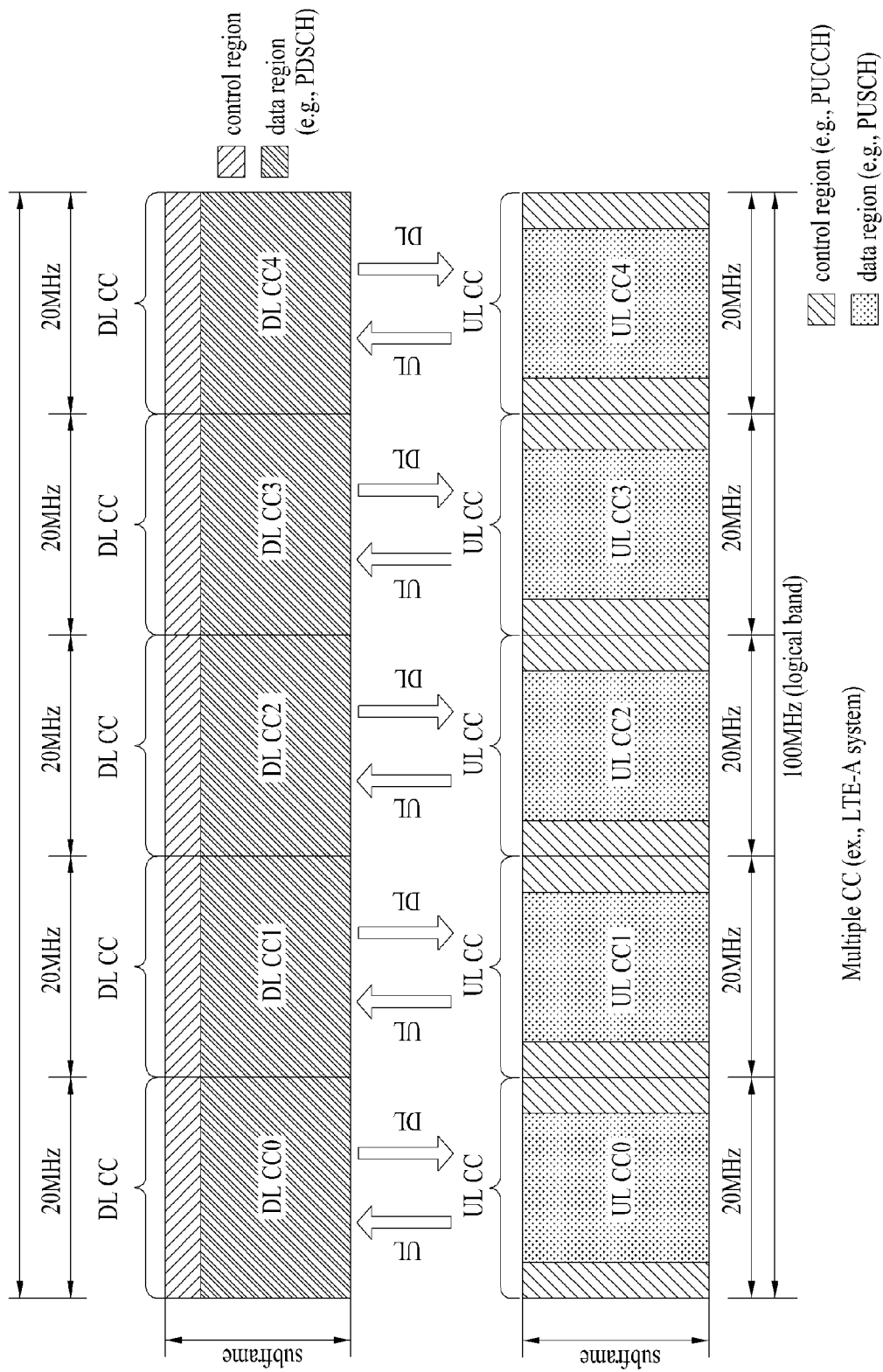
FIG. 10 is a diagram illustrating a carrier aggregation (CA) communication system.

FIG. 10 is a diagram illustrating a carrier aggregation (CA) communication system. The LTE-A system uses the carrier aggregation technology or the bandwidth aggregation technology, which uses greater uplink/downlink bandwidth through a plurality of uplink/downlink frequency blocks, to use wider frequency bandwidth. Each frequency block is transmitted using a component carrier (CC). The component carrier may be understood as carrier frequency (or center carrier or center frequency) for a corresponding frequency block.

Referring to FIG. 10, a plurality of uplink/downlink component carriers (CC) may be collected to support wider uplink/downlink bandwidth. The respective CCs may adjoin each other or not in the frequency domain. A bandwidth of each component carrier may be defined independently. Asymmetric carrier aggregation where the number of UL CCs is different from the number of DL CCs may be performed. For example, if the number of DL CCs is 2 and the number of UL CCs is 1, carrier aggregation may be configured to correspond to 2:1. DL CC/UL CC links may be fixed to the system or may be configured semi-statically. Also, even though a system full band includes N number of CCs, a frequency band that may be monitored and received by a specific user equipment may be limited to M(<N) number of CCs. Various parameters for carrier aggregation may be configured cell-specifically, user equipment group-specifically, or user equipment-specifically. Meanwhile, the control information may be set to be transmitted and received through a specific CC only. This specific CC may be referred to as a primary CC (PCC) (or anchor CC), and the other CCs may be referred to as secondary CCs (SCC).

The LTE-A system uses a concept of cell to manage radio resources. The cell is defined by combination of downlink resources and uplink resources, wherein the uplink resources may be defined selectively. Accordingly, the cell may be configured by downlink resources only, or may be configured by downlink resources and uplink resources. If carrier aggregation is supported, linkage between carrier frequency (or DL CC) of the downlink resources and carrier frequency (or UL CC) of the uplink resources may be indicated by system information. The cell operated on the primary frequency (or PCC) may be referred to as a primary cell (PCell), and the cell operated on the secondary frequency (or SCC) may be referred to as a primary cell (PCell). The PCell is used such that the user equipment performs an initial connection establishment procedure or connection re-establishment procedure. The PCell may refer to a cell indicated during a handover procedure. The Scell may be configured after RRC connection is established, and may be used to provide an additional radio resource. The Pcell and the Scell may be referred to as serving cells. Although the user equipment is in RRC-CONNECTED state, if it is not set by carrier aggregation or does not support carrier aggregation, a single serving cell configured by the P cell only exists. On the other hand, if the user equipment is in the RRC-CONNECTED state and is set by carrier aggregation, one or more serving cells may exist, wherein the serving cells may include the Pcell and full Scells. After an initial security activity procedure starts, for the user equipment supporting carrier aggregation, the network may configure one or more Scells in addition to the Pcell initially configured during a connection establishment procedure.

In LTE-A system, since the user equipment may receive data through a plurality of PDSCHs on a plurality of DL CCs, it should transmit multiple ACK/NACK information through one or more UL CCs within one subframe. Transmission of the plurality of kinds of ACK/NACK information within one subframe by using PUCCH ACK/NACK formats 1a/1b requires high transmission power and increases a peak-to-average power ratio (PAPR) of uplink transmission signals. This causes inefficient use of the transmission power, whereby coverage of the user equipment may be reduced. For this reason, in the existing LTE, ACK/NACK bundling or ACK/NACK multiplexing has been used to enable single PUCCH format 1a/1b transmission if multiple ACK/NACK transmission is required. However, as the quantity of ACK/NACK information is increased due to increase of the number of multiple DL CCs and increase of DL subframes in TDD, there is limitation in transmitting all kinds of ACK/NACK information through single PUCCH transmission. Accordingly, a method for efficiently transmitting ACK/NACK information of great quantity is required.

Figure 11:
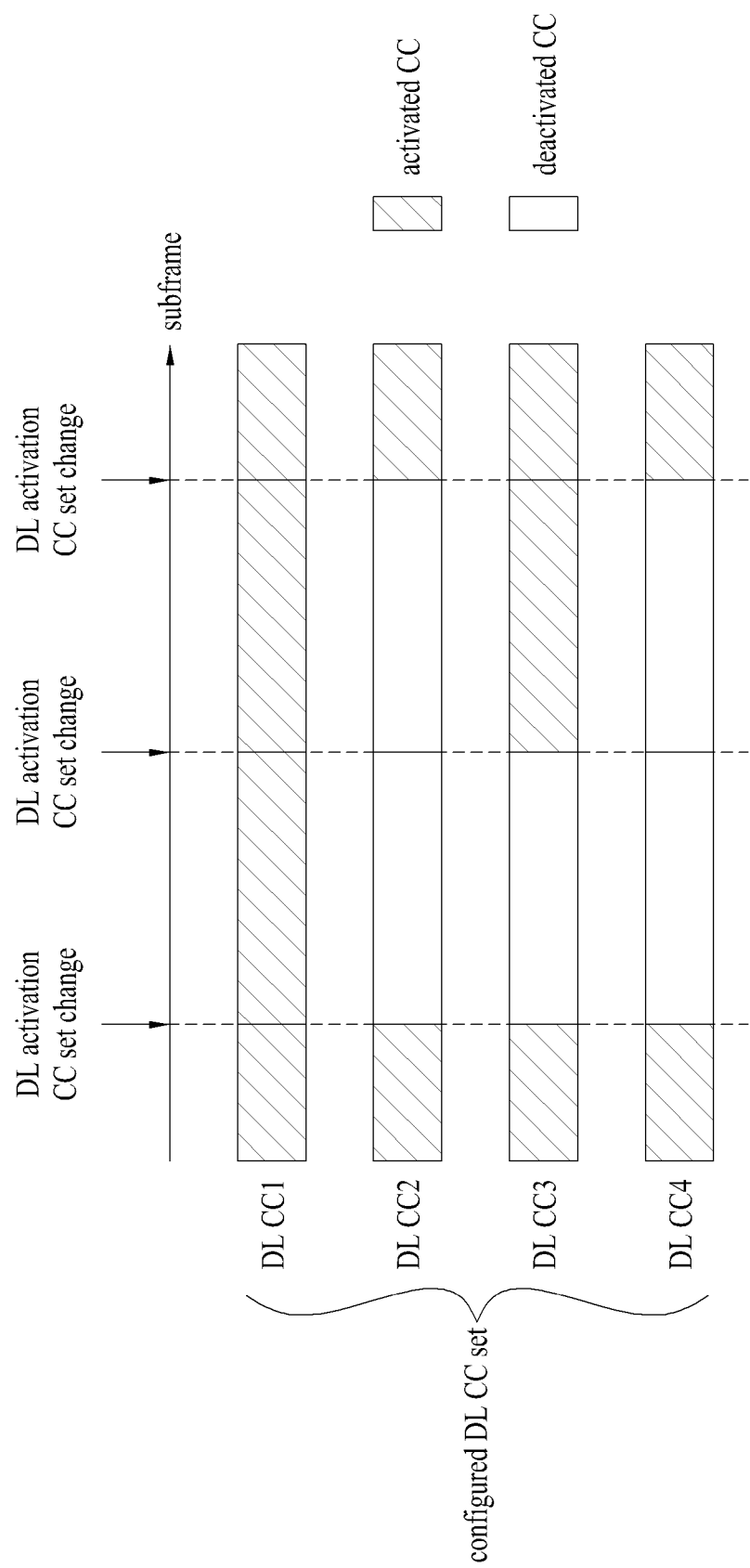
FIG. 11 is a diagram illustrating dynamic activation/deactivation of CC.

FIG. 11 is a diagram illustrating dynamic activation/deactivation of CC. As described with reference to FIG. 10, in the LTE-A system, one user equipment may use a plurality of CCs. The user equipment may receive DL data by using a plurality of CCs, or may transmit UL data through several CCs. The plurality of CCs may be configured by higher layer signaling (for example, RRC configuration). However, if data traffic features of the user equipment are bursty, the user equipment fails to efficiently use the CCs configured by higher layer signaling. In this respect, a method for dynamic activation/deactivation of DL CC sets has been suggested to prevent unnecessary power consumption due to efficient use of CCs and buffering. As such a method for activation/deactivation, a method for individually activating/deactivating CCs may be considered, or a method for simultaneously activating/deactivating other DL CCs except for specific primary CC(s) (for example, DL anchor CC) or all DL CCs may be considered.

For example, as shown in FIG. 11, a total of four DL CCs (DL CC1 to DL CC4) may be configured for one user equipment, and the number of DL CCs, which may be received, may be limited or extended using activation/deactivation signals. It is assumed that a total of four DL CCs (DL CC1 to DL CC4) are changed semi-statically by higher layer signaling (for example, RRC configuration). CC activation/deactivation signals may be transmitted using L1/L2 signals, for example, physical layer control signal (PDCCH) and MAC layer signal (PDSCH). Activation CC/deactivation CC may be configured quickly by L1/L2 activation/deactivation signals at a subframe level.

The LTE-A system considers that a plurality of ACK/NACK information/signals for a plurality of PDSCHs transmitted through a plurality of DL CCs are transmitted through a specific UL CC (for example, UL PCC). Accordingly, similarly to the existing LTE, transmission of a plurality of ACK/NACK information/signals based on a plurality of PUCCH formats 1a/1b may be considered, and application of ACK/NACK bundling/multiplexing for a plurality of DL subframes applied to a TDD status, to a plurality of DL CCs may be considered. Also, similarly to CQI transmission in the LTE, a method for transmitting a plurality of ACK/NACK information by performing channel coding (for example, Reed-Muller code, Tail-biting convolutional code, etc.) for the ACK/NACK information using the PUCCH formats 2/2a/2b may be considered. Also, transmission of the plurality of ACK/NACK information/signals based on a modified PUCCH format such as block-spreading or spreading factor (SF) reduction.

Figure 12:
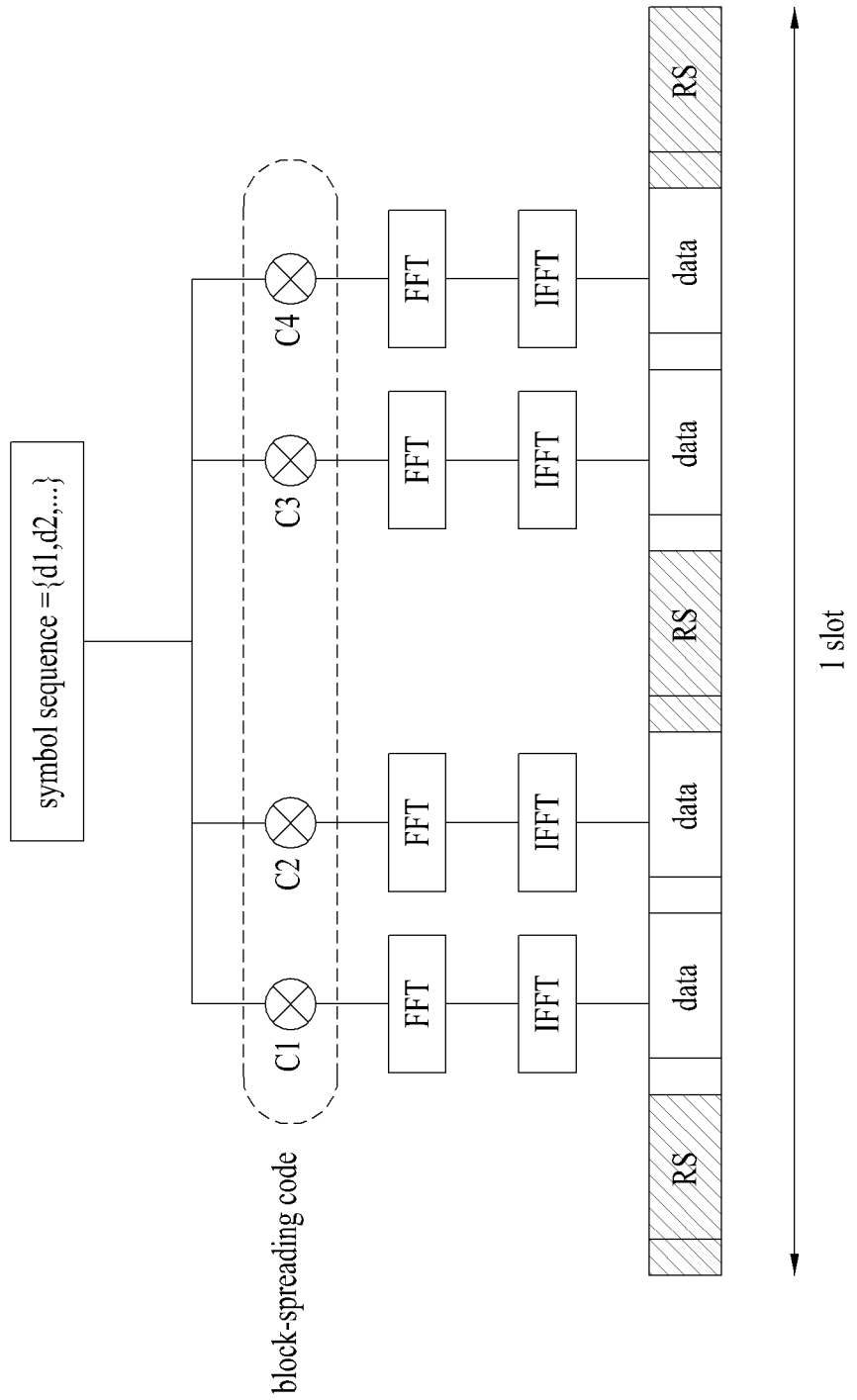
FIG. 12 is a diagram illustrating a method for transmitting a signal using a block-spreading scheme.

FIG. 12 is a diagram illustrating a method for transmitting a signal using a block-spreading scheme. The block-spreading scheme modulates control information by using the SC-FDMA scheme unlike the existing LTE PUCCH format 1 or 2. The block-spreading scheme uses block-spreading codes (that is, orthogonal codes) (for example, Walsh codes, DFT codes, etc.) to multiplex several user equipments in the same RB.

Referring to FIG. 12, one symbol sequence {d1, d2, ... } corresponds to one SC-FDMA symbol. The symbol sequence {d1, d2, ... } is transmitted after block-spread into four SC-FDMA symbols using length-4 block-spreading codes C1, C2, C3 and C4 at SC-FDMA symbol level. Although FIG. 12 illustrates that three RS symbols are used for one slot, various modifications may be made in such a manner that two RS symbols are used and block-spreading codes of length-5 are used.

The SF reduction scheme is a modification of the PUCCH formats 1a/1b used in the existing LTE, and means that one user equipment reduces SF of orthogonal codes to from the existing 4 to 2 or 1 to multiplex more ACK/NACK information in the same RB. In other words, since SF is 4 in the existing LTE, one ACK/NACK symbol may be transmitted per one slot. However, if SF is reduced to 2 or 1, the number of ACK/NACK symbols that may be transmitted by one user equipment for one slot may be extended to 2 or 4.

In the meantime, if UCI transmission through the PUCCH and UL SCH data transmission through the PUSCH should be performed simultaneously through the same subframe, UCI data and UL SCH data are multiplexed and transmitted through the PUSCH to maintain single-carrier features. In other words, the UCI is subjected to piggyback for the PUSCH through which the UL SCH data are transmitted. Meanwhile, in case of ACK/NACK transmission, the existing LTE system adopts a piggyback system considering 1-bit or 2-bit ACK/NACK only. Accordingly, if a plurality of ACK/NACK signals should be transmitted like the LTE-A system, a UCI piggyback scheme for transmission of the plurality of ACK/NACK signals or its related user equipment operation should be defined. Also, if simultaneous transmission of a plurality of ACK/NACK signals and CQI is required, the UCI piggyback scheme or related user equipment operation should be defined.

Hereinafter, a method for efficiently transmitting ACK/NACK through a PUSCH in accordance with one embodiment of the present invention will be described with reference to the drawing. Preferably, a method for efficiently transmitting multiple ACK/NACK through a PUSCH will be described. Although ACK/NACK, CQI/PMI and RI are all transmitted in the following description and drawings, transmission/event of ACK/NACK, CQI and RI may occur independently. Also, although the UCI is transmitted through the PUSCH if there are UL-SCH data in the following description and drawings, the UCI may be transmitted by scheduling through the PUSCH without UL-SCH data. Also, the embodiments of the present invention, which will be described hereinafter, may be used in combination.

Embodiment 1

Case of Non-Simultaneous Transmission of CQI+ACK/NACK

Figure 13:
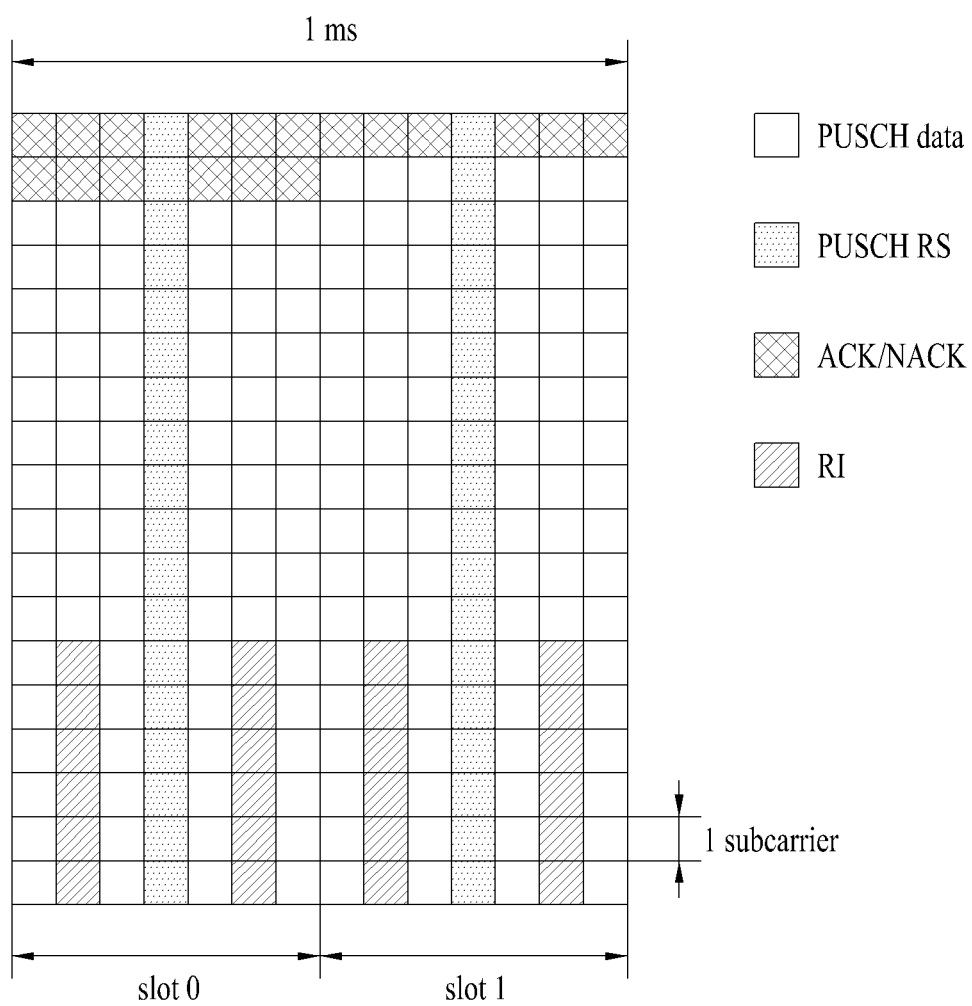
FIG. 13 and FIG. 14 are diagrams illustrating ACK/NACK transmission in case of no CQI in accordance with one embodiment of the present invention.
Figure 14:
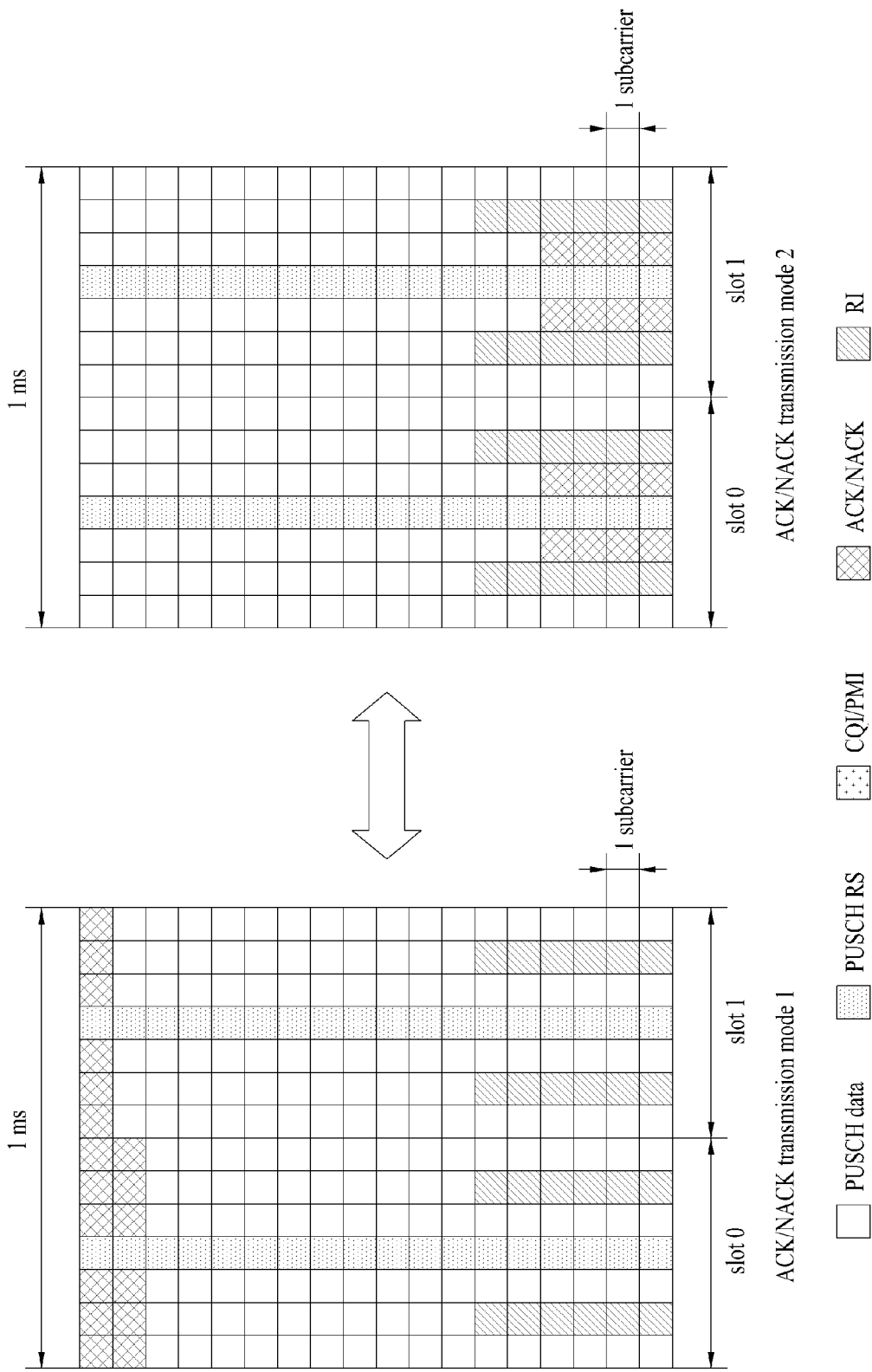

FIG. 13 and FIG. 14 are diagrams illustrating a case where CQI transmission is not required for a subframe where ACK/NACK will be transmitted, in accordance with one embodiment of the present invention.

FIG. 13 illustrates an example of transmission of multiple ACK/NACK through a PUSCH. The multiple ACK/NACK may occur due to carrier aggregation, MIMO environment, the number of limited UL backhaul subframes of a relay system, and TDD environment, etc. 1-bit or 2-bit ACK/NACK information may be generated per codeword (in other words, PUSCH). Although not shown, UCI (multiple ACK/NACK and/or RI) and UL-SCH data are multiplexed prior DFT-spreading. The number of REs used for each of ACK/NACK transmission and RI transmission may be determined on the basis of MCS and offset values ($\Delta_{offset}^{HARQ-ACK}$, $\Delta_{offset}^{RI}$) allocated for PUSCH transmission. The offset values allow different coding rates in accordance with control information and may be set semi-statically by higher layer (for example, RRC) signaling. The UL-SCH data and UCI are not mapped into the same RE. Although the PUSCH data (that is, UL-SCH data) and RI are transmitted together in the drawing, multiple ACK/NACK may only be transmitted as the case may be.

Referring to FIG. 13, resources for multiple ACK/NACK are located at a start point of UL-SCH data resources, and are sequentially mapped into all the SC-FDMA symbols on one subcarrier and then mapped on next subcarrier. In other words, the multiple ACK/NACK are mapped into time-frequency resources for the PUSCH in accordance with a time first mapping rule. Although a mapping direction of the multiple ACK/NACK within the subcarrier is not limited specially, the multiple ACK/NACK may preferably be mapped from the left to the right, that is, to increase symbol index. The UL-SCH data are rate-matched considering the multiple ACK/NACK. The same modulation order as that of the UL-SCH data may be used for the multiple ACK/NACK. A type of the multiple ACK/NACK mapped into a PUSCH resource (or corresponding logical matrix) may be a single channel coded codeword (joint coding) or multiple codewords (individual coding) channel coded individually per each ACK/NACK. Also, the multiple ACK/NACK may be mapped into the PUSCH resource in a non-coded modulation symbol type or a repeated type of non-coded modulation symbols.

Referring to CQI coding of the LTE, if ACK/NACK information size (payload size) is small (for example, less than 11 bits), although not limited to (32, k) block code, the (32, k) block code is used for the ACK/NACK information similarly to PUCCH transmission, and encoded ACK/NACK information may be repeated cyclically. If the ACK/NACK information size is small, CRC may not be used. If the ACK/NACK information size is great (for example, more than 11 bits), 8-bit CRC may be added, and channel coding and rate matching may be performed using a tail-biting convolutional code.

If each ACK/NACK is coded individually, although not limited to, the method illustrated in Table 2 and Table 3 may be used in accordance with the number of individual ACK/NACK bits. In this case, ACK/NACK for one (or two) codeword is carried in one RE.

FIG. 14 is a diagram illustrating an example of ACK/NACK transmission through a PUSCH in accordance with a transmission mode.

Referring to FIG. 14, the user equipment may transmit ACK/NACK on the PUSCH by selectively using ACK/NACK transmission mode 1 (simply, transmission mode 1) or ACK/NACK transmission mode 2 (simply, transmission mode 2). The transmission mode 1 corresponds to a method for ACK/NACK transmission as suggested in FIG. 13. In more detail, in the transmission mode 1, after the ACK/NACK is written in a channel interleaver matrix from the top to the bottom, it is transmitted through the PUSCH. Also, the transmission mode 2 corresponds to the method for ACK/NACK transmission in the existing LTE as described with reference to FIG. 9. In more detail, in the transmission mode 2, the ACK/NACK is written on a specific column subset of the channel interleaver matrix from the bottom to the top and then transmitted through the PUSCH. In this case, the specific column subset corresponds to SC-FDMA symbol next to the RS (see Table 6). The transmission mode may be configured semi-statically by higher layer (for example, RRC) signaling, or may be configured dynamically through L1/L2 control signal (for example, PDCCH and MAC message). Also, the ACK/NACK transmission mode may be selected adaptively in accordance with the status by considering requirements (for example, threshold value, parameter, etc.) (for example, TH) for selection of the ACK/NACK transmission mode. The requirements for selection of the ACK/NACK transmission mode may be scheduled previously between the base station and the user equipment, or may be configured semi-statically by higher layer (for example, RRC) signaling or dynamically through L1/L2 signal.

For example, the ACK/NACK transmission mode (simply, transmission mode) may be selected considering ACK/NACK payload. In more detail, after payload size (for example, bits) of multiple ACK/NACK of which transmission is required for a corresponding subframe is calculated and compared with TH, the transmission mode may be selected. The ACK/NACK payload size may be determined in accordance with the number of DL CCs configured for the user equipment or the number of activated DL CCs. Also, the ACK/NACK payload size may be determined in accordance with the number of a total of PDSCHs (in other words, the number of DL CCs to which the PDSCH is transmitted for one subframe) transmitted from the base station to the user equipment through one subframe. The number of a total of PDSCHs transmitted from the base station to the user equipment may be determined in accordance with downlink assignment index (DAI) within the PDCCH transmitted from the base station to indicate the number of PDCCHs (or PDSCHs). The TH may be configured using, but not limited to, the aforementioned information or related value. For example, the TH may be determined by the number of modulation symbols or bits of ACK/NACK, the number of configured DL CCs, the number of activated DL CCs, and the number of PDSCHs (or PDCCHs).

Embodiment 2

Case of Simultaneous Transmission of CQI+ACK/NACK

FIG. 15 to FIG. 19 are diagrams illustrating a case where CQI transmission is required for a subframe where multiple ACK/NACK will be transmitted in accordance with one embodiment of the present invention.

Figure 15:
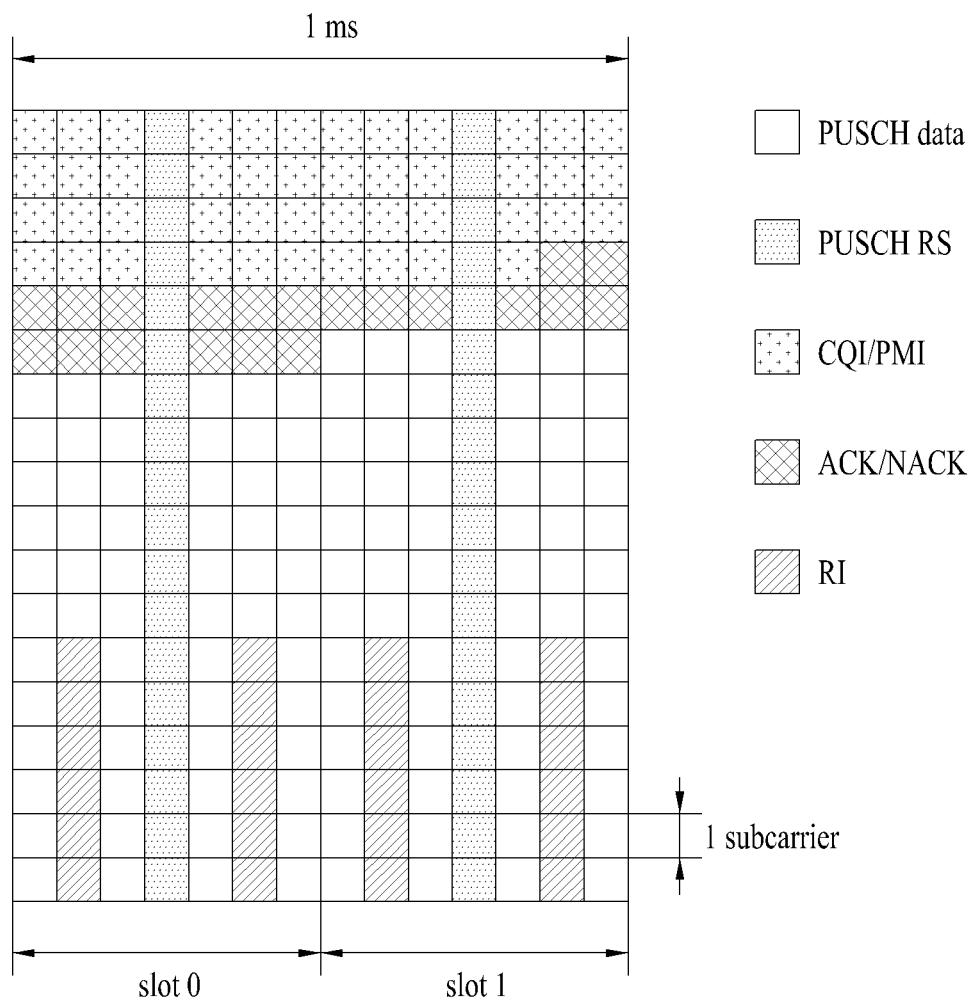
FIG. 15 to FIG. 19 are diagrams illustrating ACK/NACK transmission when simultaneous transmission of CQI and ACK/NACK is required in accordance with another embodiment of the present invention.
Figure 16:
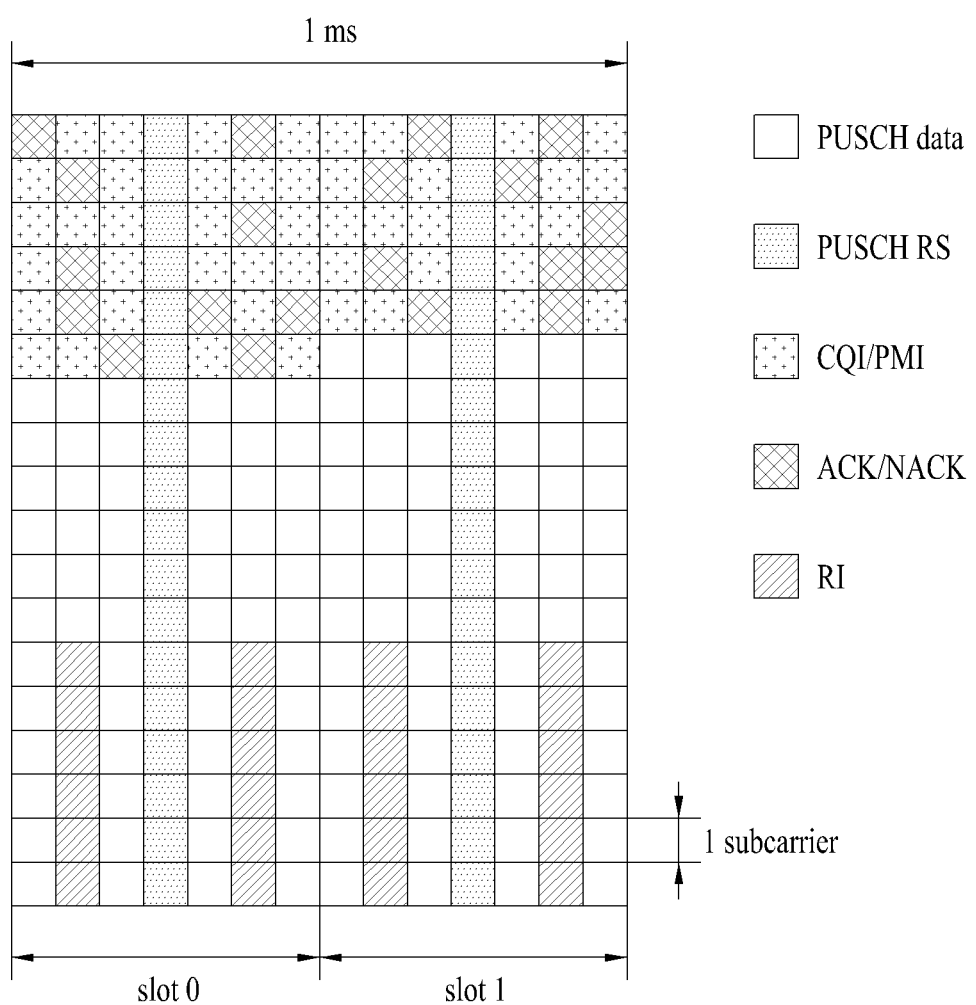
Figure 17:
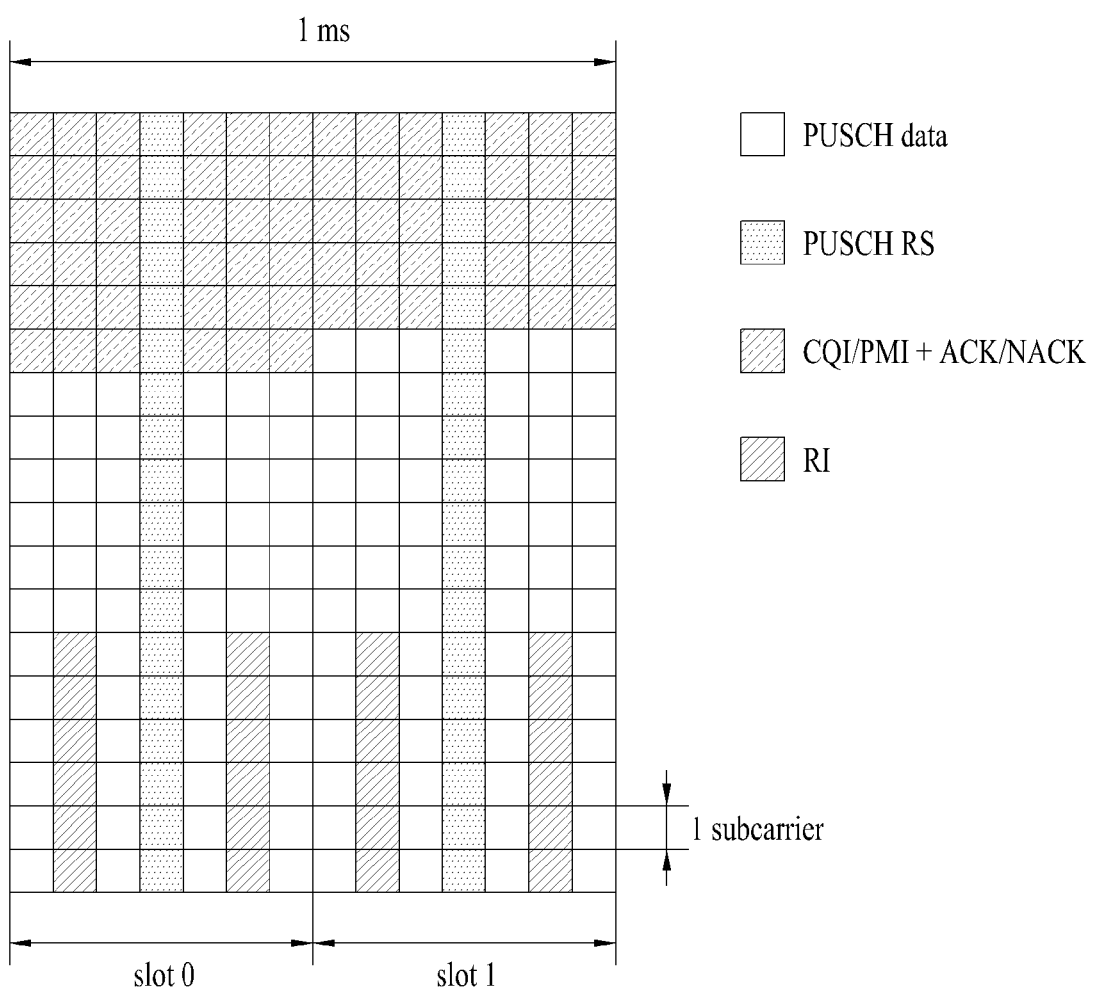

FIG. 15 to FIG. 17 illustrates a method for transmitting CQI and multiple ACK/NACK together if simultaneous transmission of CQI and multiple ACK/NACK is required. The multiple ACK/NACK may occur due to carrier aggregation, MIMO environment, the number of limited UL backhaul subframes of a relay system, and TDD environment, etc. 1-bit or 2-bit ACK/NACK information may be generated per codeword (in other words, PDSCH). Although not shown, UCI (multiple ACK/NACK and/or RI) and UL-SCH data are multiplexed prior DFT-spreading. The UL-SCH data and UCI are not mapped into the same RE. Although the PUSCH data (that is, UL-SCH data) and RI are transmitted together in the drawing, CQI+multiple ACK/NACK may only be transmitted. Also, although the resource for multiple ACK/NACK adjoins the resource for CQI in the drawing, the location of each resource may be configured independently.

Referring to FIG. 15 to FIG. 17, multiple ACK/NACK may perform piggyback to the PUSCH without drop for CQI. Resources for multiple ACK/NACK+CQI are located at a start point of UL-SCH data resources, and are sequentially mapped into all the SC-FDMA symbols on one subcarrier and then mapped on next subcarrier. In other words, the multiple ACK/NACK+CQI are mapped into time-frequency resources for the PUSCH in accordance with a time first mapping rule. A mapping direction of the multiple ACK/NACK and CQI within the subcarrier may be, but not limited specially, set independently. Accordingly, the CQI and the multiple ACK/NACK may be mapped in the same direction or reverse direction within the subcarrier, preferably the same direction (for example, from the left to the right, that is, to increase symbol index). The UL-SCH data are rate-matched considering the multiple ACK/NACK+CQI. A type of the multiple ACK/NACK mapped into a PUSCH resource (or corresponding logical matrix) may be a single channel coded codeword (joint coding) or multiple codewords (individual coding) channel coded individually by each ACK/NACK. Also, the multiple ACK/NACK may be mapped into the PUSCH resource in a non-coded modulation symbol type or a repeated type of non-coded modulation symbols.

The ACK/NACK and the CQI may be channel coded independently (individual coding). Since the ACK/NACK and the CQI are channel coded independently, two different UCI codewords are generated. ACK/NACK codeword and CQI codeword may be mapped on the PUSCH resource (or corresponding logical matrix) in due order (FIG. 15). Although FIG. 15 illustrates that the CQI is first mapped on the PUSCH resource and then the ACK/NACK is mapped, the ACK/NACK may first be mapped and then the CQI may be mapped. Also, although FIG. 15 illustrates the CQI and the ACK/NACK adjoin each other on the PUSCH resource, this is exemplary, and the CQI and the ACK/NACK may be mapped on the PUSCH resource discontinuously (for example, a start point of mapping is designated independently, using offset). Also, the ACK/NACK codeword and the CQI codeword may be mapped in a state of interleaving on the PUSCH resource (or corresponding logical matrix) (FIG. 16). Interleaving of the ACK/NACK and the CQI may be performed at a bit level, a modulation symbol level, etc. An interleaving pattern of the ACK/NACK and the CQI may be changed using subframe index, ACK/NACK payload size or related information.

As another method, single channel coding may be applied to the ACK/NACK and the CQI (joint coding). In this case, the ACK/NACK and the CQI may be mapped into the PUSCH in a type of one codeword (FIG. 17).

In the meantime, the transmission method suggested in FIG. 15 to FIG. 17 and the transmission method of the existing LTE may be used selectively as exemplarily described in FIG. 14. For example, if ACK/NACK transmission for one DL CC (for example, DL PCC) is only required, piggyback for the UCI may be performed similarly to the existing LTE (see FIG. 9). The transmission method suggested in FIG. 15 to FIG. 17 may be applied to only the case where transmission of the multiple ACK/NACK for two or more DL CCs is required. Also, if 1- or 2-bit ACK/NACK transmission is required regardless of the number of DL CCs, piggyback for the UCI may be performed similarly to the existing LTE (see FIG. 9), and the transmission method suggested in FIG. 15 to FIG. 17 may be applied to only the case where transmission of the multiple ACK/NACK exceeding 2 bits is required.

Figure 18:
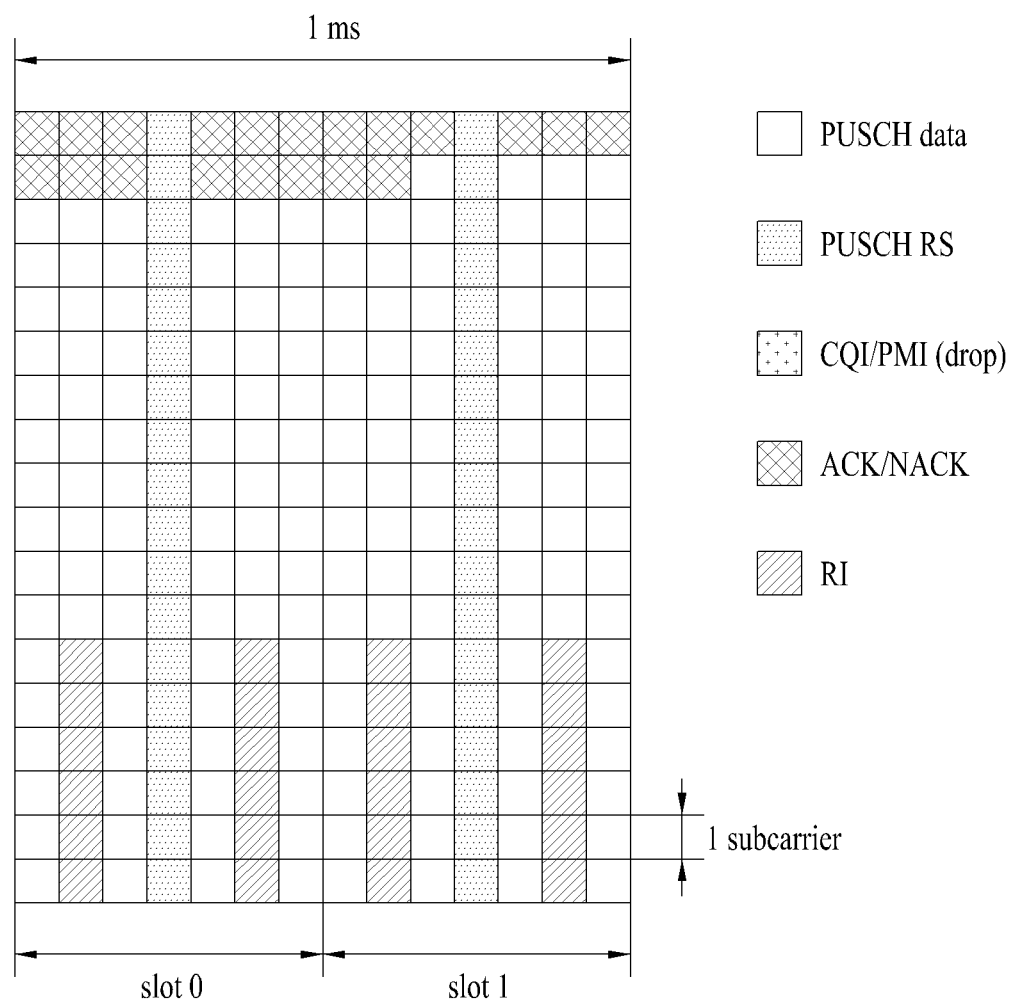

FIG. 18 illustrates a method for dropping CQI transmission if simultaneous transmission of CQI+multiple ACK/NACK is required. In other words, according to this method, piggyback of the multiple ACK/NACK to the PUSCH is performed in a state of simultaneous transmission of CQI+ACK/NACK. A type of the multiple ACK/NACK mapped into a PUSCH resource (or corresponding logical matrix) may be a single channel coded codeword (joint coding) or multiple codewords (individual coding) channel coded individually by each ACK/NACK. Also, the multiple ACK/NACK may be mapped into the PUSCH resource in a non-coded modulation symbol type or a repeated type of non-coded modulation symbols. The ACK/NACK may be mapped into SC-FDMA symbol adjacent to RS/RI through puncturing similarly to the existing LTE, or may be mapped into the PUSCH instead of the CQI as shown. In this case, the UL-SCH data are rate-matched considering the ACK/NACK.

In the meantime, the transmission method suggested in FIG. 18 and the transmission method of the existing LTE may be used selectively as exemplarily described in FIG. 14. For example, if ACK/NACK transmission for one DL CC (for example, DL PCC) is only required, piggyback for the UCI may be performed similarly to the existing LTE (see FIG. 9). The transmission method suggested in FIG. 18 may be applied to only the case where transmission of the multiple ACK/NACK for two or more DL CCs is required. Also, if 1- or 2-bit ACK/NACK transmission is required regardless of the number of DL CCs, piggyback for the UCI may be performed similarly to the existing LTE (see FIG. 9), and the transmission method suggested in FIG. 18 may be applied to only the case where transmission of the multiple ACK/NACK exceeding 2 bits is required.

Figure 19:
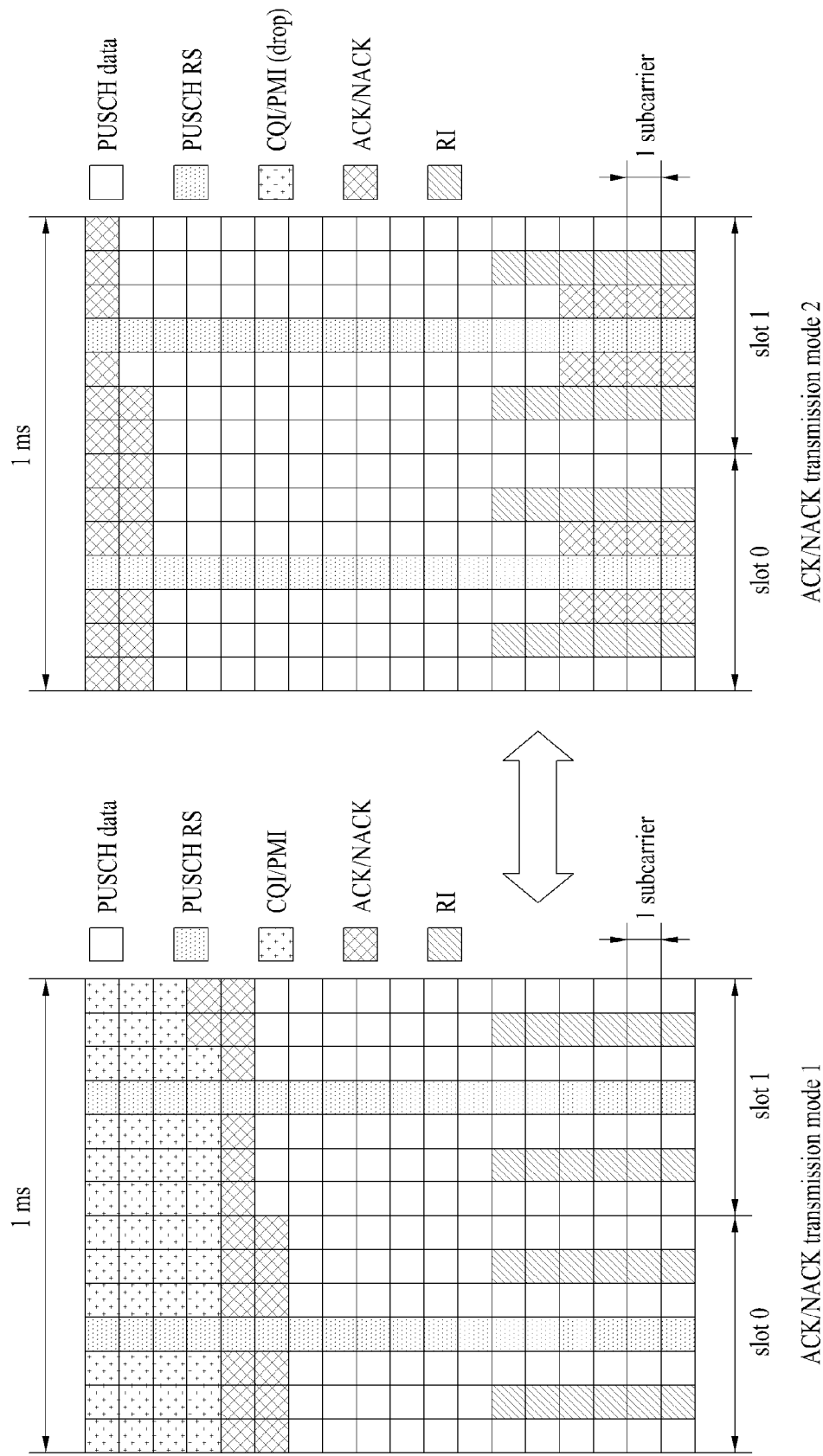

FIG. 19 illustrates an example of ACK/NACK transmission on a PUSCH in accordance with a transmission mode.

Referring to FIG. 19, the user equipment may transmit ACK/NACK on the PUSCH by selectively using ACK/NACK transmission mode 1 (simply, transmission mode 1) or ACK/NACK transmission mode 2 (simply, transmission mode 2). In the transmission mode 1, the ACK/NACK and the CQI are transmitted together. The transmission mode 1 corresponds to the method for ACK/NACK transmission as suggested in FIG. 15 to FIG. 17. Also, in the transmission mode 2, the CQI transmission is dropped, and the ACK/NACK is only transmitted through the PUSCH. The transmission mode 2 corresponds to the method for ACK/NACK transmission as suggested in FIG. 18. The transmission mode may be configured semi-statically by higher layer (for example, RRC) signaling, or may be configured dynamically through L1/L2 control signal (for example, PDCCH and MAC message). Also, the ACK/NACK transmission mode may be selected adaptively in accordance with the status by considering requirements (for example, threshold value, parameter, etc.) (for example, TH) for selection of the ACK/NACK transmission mode. The requirements for selection of the ACK/NACK transmission mode may be scheduled previously between the base station and the user equipment, or may be configured semi-statically by higher layer (for example, RRC) signaling or dynamically through L1/L2 signal.

For example, more detailed description of the ACK/NACK transmission mode will be made. First of all, the ACK/NACK transmission mode may be selected considering MCS/rank information for data transmission. For example, the transmission mode 1 or 2 may be selected considering a modulation level set for UL-SCH data transmission, code rate, rank information and/or the amount of UCI of which transmission is required for a corresponding subframe, or information related to the amount of UCI. In more detail, on the assumption that the transmission mode is applied to all of the UCI of which transmission is required for a corresponding subframe with respect to given MCS/rank, after data channel loss value or code rate of rate-matched/punctured actual data channel is considered and compared with TH, the ACK/NACK transmission mode may be selected. The TH may be set to, but not limited to, maximum matched-rate (maximum code rate of UL-SCH data that may actually be transmitted to the PUSCH when considering UCI piggyback). The TH may be set to one value regardless of modulation level/rank, or may be set per modulation level, or may be set per modulation level for each rank. In more detail, when considering piggyback of all of the UCI of which transmission is required for a corresponding subframe in a given MCS/rank (that is, when the transmission mode 1 is applied), the transmission mode 1 may be applied if a code rate for UL-SCH data is less than the TH (for example, maximum matched-rate), and the transmission mode 2 may be applied if not so.

Next, the transmission mode may be selected considering full UCI or ACK/NACK payload. For example, considering payload (the presence or absence of RI) of full UCI of which transmission is required for a corresponding subframe or payload for a plurality of ACK/NACK, the transmission mode 1 or the transmission mode 2 may be selected. In this case, two schemes may be considered as follows.

1) Full UCI Payload Based Scheme

After payload size for full UCI of which transmission is required for a corresponding subframe is calculated and then compared with the TH, the transmission mode may be selected. The TH may be determined by, but not limited to, the number of modulation symbols of the full UCI, the number of bits, or related information.

2) ACK/NACK Payload Based Scheme.

The transmission mode may be selected considering ACK/NACK payload of which transmission is required for a corresponding subframe. In more detail, after payload size (for example, the number of bits) for multiple ACK/NACK of which transmission is required for a corresponding subframe is calculated and then compared with the TH, the transmission mode may be selected. The ACK/NACK payload size may be determined in accordance with the number of DL CCs configured for the user equipment or the number of activated DL CCs. Also, the ACK/NACK payload size may be determined in accordance with the number of a total of PDSCHs (in other words, the number of DL CCs to which the PDSCH is transmitted for one subframe) transmitted from the base station to the user equipment through one subframe. The number of a total of PDSCHs transmitted from the base station to the user equipment may be determined in accordance with downlink assignment index (DAI) within the PDCCH transmitted from the base station to indicate the number of PDCCHs (or PDSCHs). The TH may be configured using, but not limited to, the aforementioned information or related value. For example, the TH may be determined by the number of modulation symbols or bits of ACK/NACK, the number of configured DL CCs, the number of activated DL CCs, and the number of PDSCHs (or PDCCHs).

Figure 20:
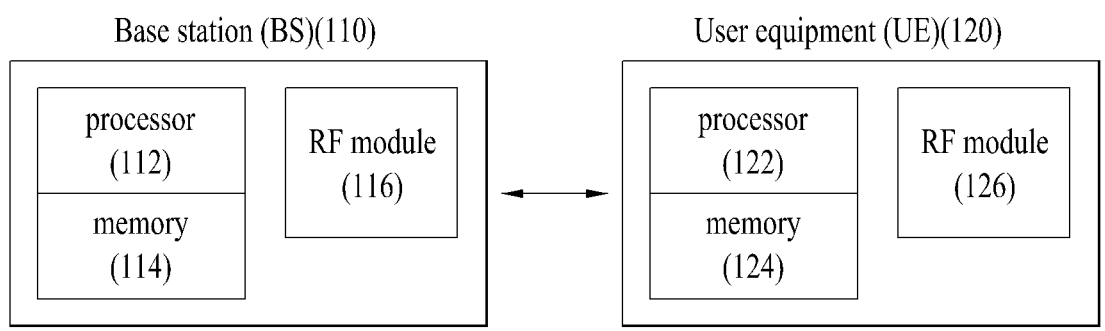
FIG. 20 is a diagram illustrating a base station and a user equipment, which can be applied to one embodiment of the present invention.

FIG. 20 is a diagram illustrating a base station and a user equipment, which may be applied to one embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 20, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be used for a wireless communication device such as a user equipment, a relay and a base station.

The invention claimed is:

1. A method for transmitting acknowledgement/negative acknowledgement (ACK/NACK) information from a user equipment through a physical uplink shared channel (PUSCH) in a wireless communication system, the method comprising:
receiving data;
generating ACK/NACK information based on the received data;
writing the generated ACK/NACK information on a matrix corresponding to a PUSCH resource; and
transmitting the written ACK/NACK information with uplink data through the PUSCH,
wherein the generated ACK/NACK information is written on the matrix moving from a top side of the matrix to a bottom side of the matrix in accordance with a time-first method, in a first transmission mode,
wherein the generated ACK/NACK information is written on a subset of a column in the matrix moving from the bottom side of the matrix to the top side of the matrix, in a second transmission mode,
wherein the first transmission mode is selected if a code rate for the uplink data is less than a threshold, and
wherein the second transmission mode is selected if the code rate for the uplink data is equal to or greater than the threshold.

2. The method according to claim 1, wherein the generated ACK/NACK information is written in elements of a second row of the matrix after elements of a first row of the matrix are all written in the first transmission mode.

3. The method according to claim 1, wherein the column subset corresponds to a single carrier frequency division multiple access (SC-FDMA) symbol next to a SC-FDMA symbol for a reference signal.

4. The method according to claim 1, wherein, if channel quality information is scheduled to be transmitted for a same subframe as that of the generated ACK/NACK information in the first transmission mode, the channel quality information and the generated ACK/NACK information are written within the matrix in accordance with the time-first rule in a concatenation state.

5. The method according to claim 1, wherein, if channel quality information is scheduled to be transmitted for a same subframe as that of the generated ACK/NACK information in the first transmission mode, the channel quality information and the generated ACK/NACK information are written within the matrix in accordance with the time-first rule in an interleaved state.

6. The method according to claim 1, wherein, if channel quality information is scheduled to be transmitted for a same subframe as that of the generated ACK/NACK information in the first transmission mode, transmission of the channel quality information is dropped.

7. A user equipment configured to transmit acknowledgement/negative acknowledgement (ACK/NACK) information through a physical uplink shared channel (PUSCH) in a wireless communication system, the user equipment comprising:
a radio frequency (RF) unit; and
a processor,
wherein the processor is configured to receive data, generate ACK/NACK information based on the received data, write the generated ACK/NACK information on a matrix corresponding to a PUSCH resource, and transmit the written ACK/NACK information with uplink data through the PUSCH,
wherein the generated ACK/NACK information is written on the matrix moving from a top side of the matrix to a bottom side of the matrix in accordance with a time-first method, in a first transmission mode, and
wherein the generated ACK/NACK information in a second transmission mode is written on a subset of a column in the matrix moving from the bottom side of the matrix to the top side of the matrix, in a second transmission mode,
wherein the first transmission mode is selected if a code rate for the uplink data is less than a threshold, and
wherein the second transmission mode is selected if the code rate for the uplink data is equal to or greater than the threshold.

8. The user equipment according to claim 7, wherein the generated ACK/NACK information is written in elements of a second row of the matrix after elements of a first row of the matrix are all written in the first transmission mode.

9. The user equipment according to claim 7, wherein the column subset corresponds to a single carrier frequency division multiple access (SC-FDMA) symbol next to a SC-FDMA symbol for a reference signal.

10. The user equipment according to claim 7, wherein, if channel quality information is scheduled to be transmitted for a same subframe as that of the generated ACK/NACK information in the first transmission mode, the channel quality information and the generated ACK/NACK information are written within the matrix in accordance with the time-first rule in a concatenation state.

11. The user equipment according to claim 7, wherein, if channel quality information is scheduled to be transmitted for a same subframe as that of the generated ACK/NACK information in the first transmission mode, the channel quality information and the generated ACK/NACK information are written within the matrix in accordance with the time-first rule in an interleaved state.

12. The user equipment according to claim 7, wherein, if channel quality information is scheduled to be transmitted for a same subframe as that of the generated ACK/NACK information in the first transmission mode, transmission of the channel quality information is dropped.

* * * * *